United States Patent
Cadena C. et al.

(10) Patent No.: US 7,314,569 B2
(45) Date of Patent: Jan. 1, 2008

(54) TREATMENT OF ARSENIC-CONTAMINATED WATER USING AKAGANEITE ADSORPTION

(75) Inventors: Fernando Cadena C., Las Cruces, NM (US); Michael D. Johnson, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 415 days.

(21) Appl. No.: 10/818,552

(22) Filed: Apr. 5, 2004

(65) Prior Publication Data

US 2004/0262225 A1 Dec. 30, 2004

Related U.S. Application Data

(60) Provisional application No. 60/460,111, filed on Apr. 4, 2003.

(51) Int. Cl.
*C02F 1/52* (2006.01)

(52) U.S. Cl. ............ 210/681; 210/688; 210/716; 210/912; 423/138; 423/632

(58) Field of Classification Search ........ 210/679, 210/681, 682, 683, 688, 981, 982, 983, 988, 210/911, 634, 702, 912, 264, 279, 716; 423/138, 423/632, 633; 588/256
See application file for complete search history.

(56) References Cited

U.S. PATENT DOCUMENTS

| | | | |
|---|---|---|---|
| 3,563,890 A * | 2/1971 | Perl et al. ............ 210/679 |
| 5,124,044 A * | 6/1992 | Cassidy et al. ........ 210/683 |
| 5,205,931 A * | 4/1993 | Iida ................... 210/264 |
| 5,453,201 A | 9/1995 | Etzel et al. |
| 5,591,346 A | 1/1997 | Etzel et al. |
| 5,769,961 A * | 6/1998 | Peters et al. ........... 134/25.1 |
| 5,908,557 A | 6/1999 | Smith et al. |
| 6,042,731 A | 3/2000 | Bonnin |
| 6,107,354 A | 8/2000 | Shaniuk et al. |
| 6,368,510 B2 | 4/2002 | Friot |
| 6,468,942 B1 * | 10/2002 | Sansalone ............. 502/402 |
| 6,787,041 B2 * | 9/2004 | Chwirka .............. 210/668 |
| 6,790,363 B2 * | 9/2004 | Vempati .............. 210/668 |
| 6,824,690 B1 * | 11/2004 | Zhao et al. ........... 210/682 |
| 6,896,813 B1 * | 5/2005 | Harthill et al. ........ 210/660 |
| 2001/0052495 A1 | 12/2001 | Friot |
| 2002/0025911 A1 | 2/2002 | Aoyagi et al. |
| 2002/0090261 A1 | 7/2002 | Sansalone |
| 2003/0150818 A1 * | 8/2003 | Carter et al. .......... 210/722 |

FOREIGN PATENT DOCUMENTS

JP 57-127409 * 8/1982

OTHER PUBLICATIONS

Translated Abstract for JP57-127409.*

(Continued)

*Primary Examiner*—Joseph Drodge
(74) *Attorney, Agent, or Firm*—Deborah A. Peacock; Peacock Myers, P.C.; Vidal A. Oaxaca

(57) ABSTRACT

The present invention comprises a method and composition using akaganeite, an iron oxide, as an ion adsorption medium for the removal of arsenic from water and affixing it onto carrier media so that it can be used in filtration systems.

19 Claims, 21 Drawing Sheets

OTHER PUBLICATIONS

American Chemical Society, "Existing Technologies Can Remove Arsenic, but at a Cost", *Environmental Science & Technology News*, (Feb. 1, 2000),75 A.

Bates, Jared T., "Batch Studies of Arsenic Removal from Drinking Water Using Manganese Greensand", *MS Thesis, Las Cruces NM, New Mexico state University*, Abstract and index,(1998),5pp.

Canning, Kathie , "Water/Wastewater Treatment: Technology Takes Arsenic to New Lows", *Pollution Engineering*, (May 2000),10-11.

Environmental Protection Agency, "Technical Fact Sheet: Final Rule for Arsenic in Drinking Water", *USEPA EPA 815-F-00-016 (website printout)*, (2001),1-5.

Environmental Protection Agency, "Technologies and Costs for Removal of Arsenic from Drinking Water", *USEPA EPA-815-R-00-028*, Index,(Dec. 2000).

Gregor, Jan , "Arsenic Removal During Conventional Aluminium-Based Drinking-Water Treatment", *Water Resources*, vol. 35, No. 7, (2001), 1659-1664.

Metcalf & Eddy, Inc., "Wastewater Engineering: Treatment, Disposal, and Reuse", Third Edition revised by George Tchobanoglous and Franklin L. Burton, Irwin-McGraw-Hill, Inc., Boston MA, Index,(1991).

Miller, Gregory P., et al., "A Comment on Arsenic Species Separation Using Ion Exchange", *Water Resources*, vol. 34, (2000),1397-1400.

Pontius, Frederick W., et al., "Health Implications of Arsenic in Drinking Water", *Journal of the American Water Works Association*, vol. 86, (1994),52-63.

Ryker, Sarah J., et al., "Mapping Arsenic in Groudwater", *Geotimes*, vol. 46, (Nov. 2001),34-36.

Sanchez, Cassia M., "Batch Studies for the Treatment of Arsenic Contaminated Water Using an Iron Oxyhydroxide", *MS Thesis*, Las Cruces NM, New Mexico State University,Abstract and index,(2002).

Sugii, Atsushi , et al., "Adsorption of Mercury(II) on Macroreticular Styrene-Divinylbenzene Copolymer Beads", Pergamon Press Ltd, Great Britain, (1979),941-944.

Thirunavukkarasu, O. S., et al., "Removal of Arsenic in Drinking Water by Iron Oide-Coated Sand and Ferrihydrite—Batch Studies", *Water Qual. Res. J.*, Canada; vol. 36, No. 1, (2001),55-70.

Thompson, Graham W., "Removal of MTBE from Aqueous Solution by Tailored Zeolite Sorption", *MS Thesis*, Las Cruces NM, New Mexico State University, Abstract and Index,(2000).

Tokunaga, S. , et al., "Removal of Arsenic(III) and Arsenic(V) Ions from Aqueous Solutions with Lanthanum(***) Salt and Comparison with Aluminum(III), Calcium(II), and Iron(III) Salts", *Water Environmental Research*, vol. 71, No. 3, (1999),299-306.

Torrens, Kevin D., "Water Works: Evaluating Arsenic Removal Technologies", *Pollution Engineering*, vol. 31, (1999),25-28.

Tortora, Phyllis G., et al., "Understanding Textiles", Fifth Edition, Merrill of Prentice Hall, Upper Saddle River NJ, Columbus OH, Index,(1997).

Vogels, Christopher M., "Remediation of Arsenic from Aqueous Solution Using Iron(II) and Iron(VI) and the Reaction Kenetics and Mechanisms of the Oxidation of Arsenite and Phenylarsine Oxide by Potassium Ferrate", *MS Thesis*, Las Cruces NM, New Mexico State University, Abstract and index ,(1996).

Vrijenhoek, Eric M., et al., "Arsenic Removal fromDrinking Wate by a "Loose" Nanofiltration Membrane", *Desalination*, vol. 130, (2000),265-277.

Waychunas, Glenn A., "Crystal Chemistry of Oxides and Oxyhydroxides", *Textbook: Oxide Minerals: Petrologic and Magnetic Significance*, Chelsea MI, BookCrafters, Inc., (1991),11-61.

Xy, Yanhua , et al., "Adsorption of Arsenic(V) by Use of Aluminium-Loaded Shirasu-Zeolites", *Chemistry Letters*, (1998),1015-1016.

Editor, "Technology Update—Existsing Technologies can Remove Arsenic, but at a Cost", *Environmental Science & Technology—News, American Chemical Society*, (2000),75A.

Jekel, M. , et al., "Comparison of Conventional and New Techniques for the Removal of Arsenic in a Full Scale Water Treatment Plant", *Proceedings of IWA World Water Congress*, Special Subject No. 13, (1999),16-19.

Schwertmann, C. , et al., "Iron Oxides in the Laboratory: Preparation and Characterization", Weinheim, Germany: VCH Verlagsgesselschaft mbH, Index pp., (10991), undated.

* cited by examiner

TREATMENT OF ARSENIC-CONTAMINATED WATER USING AKAGANEITE ADSORPTION

CROSS-REFERENCE TO RELATED APPLICATIONS

This application claims priority to U.S. Provisional Patent Application Ser. No. 60/460,111, entitled "Treatment of Arsenic-Contaminated Water Using Akaganeite Adsorption", filed on Apr. 4, 2003, and the specification thereof is incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. DE-FC04-01AL67403 awarded by WERC/U.S. Department of Energy.

BACKGROUND OF THE INVENTION

1. Field of the Invention (Technical Field):

The present invention relates to the use of akaganeite-coated carrier media for the adsorptive removal of arsenic from water.

2. Description of Related Art

Note that the following discussion refers to a number of publications by author(s) and year of publication, and that due to recent publication dates certain publications are not to be considered as prior art vis-à-vis the present invention. Discussion of such publications herein is given for more complete background and is not to be construed as an admission that such publications are prior art for patentability determination purposes.

Arsenic contamination in surface water and groundwater systems is a result of both natural occurrences and human activities. Recent amendments to the United States Safe Drinking Water Act reduce the maximum contaminant level (the "MCL") for arsenic from 50 µg/L to 10 µg/L. The economic impact of the new regulatory constraints on small communities is expected to be severe because traditional treatment technologies are not economically and technically feasible for use in the smaller systems used by such communities.

Depending on the source and area of the natural water, arsenic exists in a number of forms including different oxidation states, organic-bound, or either dissolved or particulate. The amount and form of arsenic in natural water depends on factors such as pH, particulate and natural organic matter concentrations, biological activity, and dissolved oxygen levels (Gregor, J. *Water Resources* 2001, 35, 1659).

Although a total of four oxidation states exist for arsenic, arsenic exhibits the two most common oxidation states when in an aqueous form, arsenite (also known as arsenic (III)) and arsenate (also known as arsenic (V)) (Sanchez, C. M. *Batch Studies for the Treatment of Arsenic Contaminated Water Using an Iron Oxyhydroxide* 2002, MS Thesis, New Mexico State University). In most natural water systems, the inorganic arsenic species are dominant—arsenate is more common in surface waters and arsenite is more common in ground waters. Over the typical pH range found in water treatment, arsenite exits as the uncharged $H_3AsO_3$ (Thirunavukkarasu, O. S. et al. *Water Quality Research Journal of Canada* 2001, 36, 55), and arsenate is typically present as $HAsO_4^{2-}$ (Vrijenhoek, E. M., Waypa, J. J. *Desalination* 2000, 130, 265). The organic forms of arsenic, MMAA and DMAA, are reportedly rarely present at concentrations above 1 µg/L (Thirunavukkarasu, O. S. et al. 2001). Arsenic speciation is also dependent on the source of water. Up to 60% of arsenic in surface water is reportedly organic, whereas organic arsenic is undetectable in groundwater using conventional measurement methods (Miller, G. P. et al., *Water Resources* 2001, 34, 1397). Geographical location also affects the occurrence of arsenic in water systems. A large number of geographic areas are of concern because the groundwater systems in those locations will be in violation of the new MCL of 10 µg/L.

Arsenic is an acute and chronic toxin and human carcinogen (Miller et al., 2000). When setting drinking water standards, the primary consideration is the carcinogenic effect of low level chronic exposure to arsenic (Pontius, F. W. et al. *J. American Water Works Assoc.* 1994, 86, 52). However, the health effects of the different species of arsenic vary. Arsenite is the most toxic, followed by arsenate, and the organic forms of DMA and MMA are least toxic (Pontius et. al., 1994).

Various approaches exist for the treatment of water contaminated with arsenic. The more common technologies can be classified as chemical coagulation/precipitation processes, membrane separation processes, and adsorptive processes. These processes were developed to target other contaminants in water treatment, but have been modified to improve the removal of arsenic.

Chemical coagulation, using either an aluminum-based or iron-based coagulant, is the most common treatment for arsenic removal. Coagulation combined with filtration has traditionally been used in surface water treatment to remove particulates and dissolved colloids in the water. However, removal by coagulation is difficult for dissolved species of arsenic. It has been reported that soluble arsenate is removable by adsorption to aluminum-based floc, but soluble arsenite is not removable by such a method (Gregor, 2001). Therefore, to effectively remove arsenite, it must be oxidized to arsenate. This is usually accomplished by pre-chlorination, which can lead to undesirable disinfection bi-products.

Several chemicals, including iron and aluminum, can be utilized in coagulation or precipitation processes. Such processes include lime softening, iron/manganese oxidation (US EPA *Technologies and Costs for Removal of Arsenic in Drinking Water* 2000, EPA-815-R-00-028), sulfide or hydroxide precipitation (Torrens K. D. *Pollution Engineering* 1999, 31, 25), and precipitation with lanthanum salt (Tokunaga, S. et al. *Environment Research* 1999, 71, 299).

Membrane separation is achieved through a selective barrier. However, a driving force or difference in potential is required to create movement through the membrane. The driving force can be pressure, concentration, electrical potential, or temperature (US EPA, 2000). Because of the system requirements, membrane separation can be costly. The most common type of membrane process is pressure driven. Pressure driven membrane systems are classified by pore size and include reverse osmosis ("RO"), nanofiltration, ultrafiltration, and microfiltration (US EPA, 2000). For membranes with smaller pores, more pressure is required, and that causes an increase in energy and costs.

For the removal of arsenic from groundwater, which contains 80% to 90% dissolved arsenic species, RO is effective (US EPA, 2000). During RO, feed water passes through the membrane by a pressure gradient. As the osmotic pressure increases, salts are rejected across the membrane and a concentrated discharge stream is produced. As in other processes, RO removes arsenate more efficiently than it removes arsenite. Therefore, an oxidation step may be added to the process for removing arsenite (US EPA, 2000). Although RO has reportedly removed up to 99% of total arsenic in source waters (US EPA, 2000), the system has disadvantages, which include higher volume, disposal of the concentrated discharge stream, and high operation costs.

Nanofiltration also has been researched as a lower cost alternative because of the large molecular weight of the typical arsenic species of $H_3AsO_3$ (126 g/mole) and $HAsO_4^{2-}$ (140 g/mole) (Vrijenhoek and Waypa, 2000). Electric potential membranes such as electrodialysis reversal ("EDR") are efficient for arsenic remediation.

Adsorptive processes to remove arsenic are usually performed with activated alumina ("AA"). As in ion exchange, packed beds are used to remove contaminates from water by performing an ion exchange. Ions such as fluoride, arsenic, selenium, and silica are exchanged with the surface hydroxides on the alumina (US EPA, 2000). However, when all the adsorption sites are filled, the media must be regenerated. Parameters such as pH, oxidation state of arsenic, competing ions, empty bed contact time, and regeneration have a significant effect on the amount of arsenic removed (US EPA, 2000). Disadvantages of such a system include the disposal of the regenerants and spent media, and the effects on secondary water quality.

Akaganeite, a microscopic iron oxyhydroxide, is a very effective adsorbent for the removal of arsenate from drinking water. However, its application is limited to large systems where conventional flocculation followed by sedimentation may be used to remove the saturated adsorbent from water. For example, arsenic removal studies using akaganeite as a treatment have been developed by the Technical University of Berlin (Germany). In the University's studies, akaganeite is referred to as granulated ferric hydroxide (GFH), but is identified by the molecular formula $\beta$-FeOOH. The GFH is media of irregular grain size up to 2 mm in size, and reportedly contains 52-57% akaganeite (Jekel, M., Seith, R. *Proceedings of IWA World Water Congress, Special Subject No.* 13 1999, 16). Even though the GFH is an adsorbent, it operates as a particle filter, so turbidity can also be alleviated (Jekel and Seith, 1999). Therefore, the process is effective for particulate and soluble forms of arsenic. Operation parameters, such as pH and drying factors, affect the removal of arsenic. The GFH must not be dried, and the binding capacity decreases with rising pH (Jekel and Seith, 1999). GFH can treat between 70,000 and 80,000 bed-volumes, and could be implemented as a point-of-use treatment (Jekel and Seith, 1999).

Iron hydroxide laden zeolites (Canning, K. *Pollution Engineering* 2000, 32, 10) and the iron (II) laden zeolite minerals described in U.S. Pat. No. 6,042,731 have demonstrated an increased affinity for arsenic. Neither approach utilizes akaganeite.

BRIEF SUMMARY OF THE INVENTION

The present invention comprises a method for removing arsenic from an aqueous, liquid, or other medium comprising attaching akaganeite to a medium to form an akaganeite laden medium, contacting the aqueous, liquid, or other fluid medium containing the arsenic with the akaganeite laden carrier medium so that the arsenic is adsorbed onto the akaganeite, and separating the akaganeite laden carrier medium from the aqueous, liquid, or other fluid medium so that the arsenic is removed from the aqueous, liquid, or other fluid medium. The arsenic may comprise arsenate and/or arsenite.

The akaganeite may be formed by dissolving a ferric chloride in water to form a ferric chloride solution, incubating the ferric chloride solution so that the ferric chloride is hydrolyzed, harvesting the akaganeite, and concentrating the akaganeite in an aqueous solution. The akaganeite may be concentrated in solution at between approximately 10,000 to 70,000 mg/L, preferably 40,000 mg/L.

The akaganeite is mixed in solution with the medium so that the akaganeite is bound to the medium to form an akaganeite laden medium. The medium may comprise a zeolite, and may be a clinoptilolite. The zeolite medium may be sieved, and the mass recovered may be that retained between a No. 20 sieve and a No. 40 sieve.

The medium may comprise a material such as pumice, sand, limestone, sea shells, fibrous material, and/or a combination. The fibrous material may comprise cotton. The medium may also comprise a wet medium which may include a material such as cellulose sponges, gel-based media, and/or a combination.

The invention also comprises a composition for removing arsenic from an aqueous, liquid, or fluid medium comprising an akaganeite bound to a medium. The medium may comprise a zeolite or a material such as pumice, sand, limestone, sea shells, a fibrous material, cotton, and/or a combination.

A primary object of the present invention is to remove arsenic from water using akaganeite.

Another object of the present invention is to remove arsenic from water using filtration.

A primary advantage of the present invention is a reduced cost of the water treatment of small water systems.

Another advantage of the present invention is that it provides a means for point-of-use treatment for the removal of arsenic from water.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
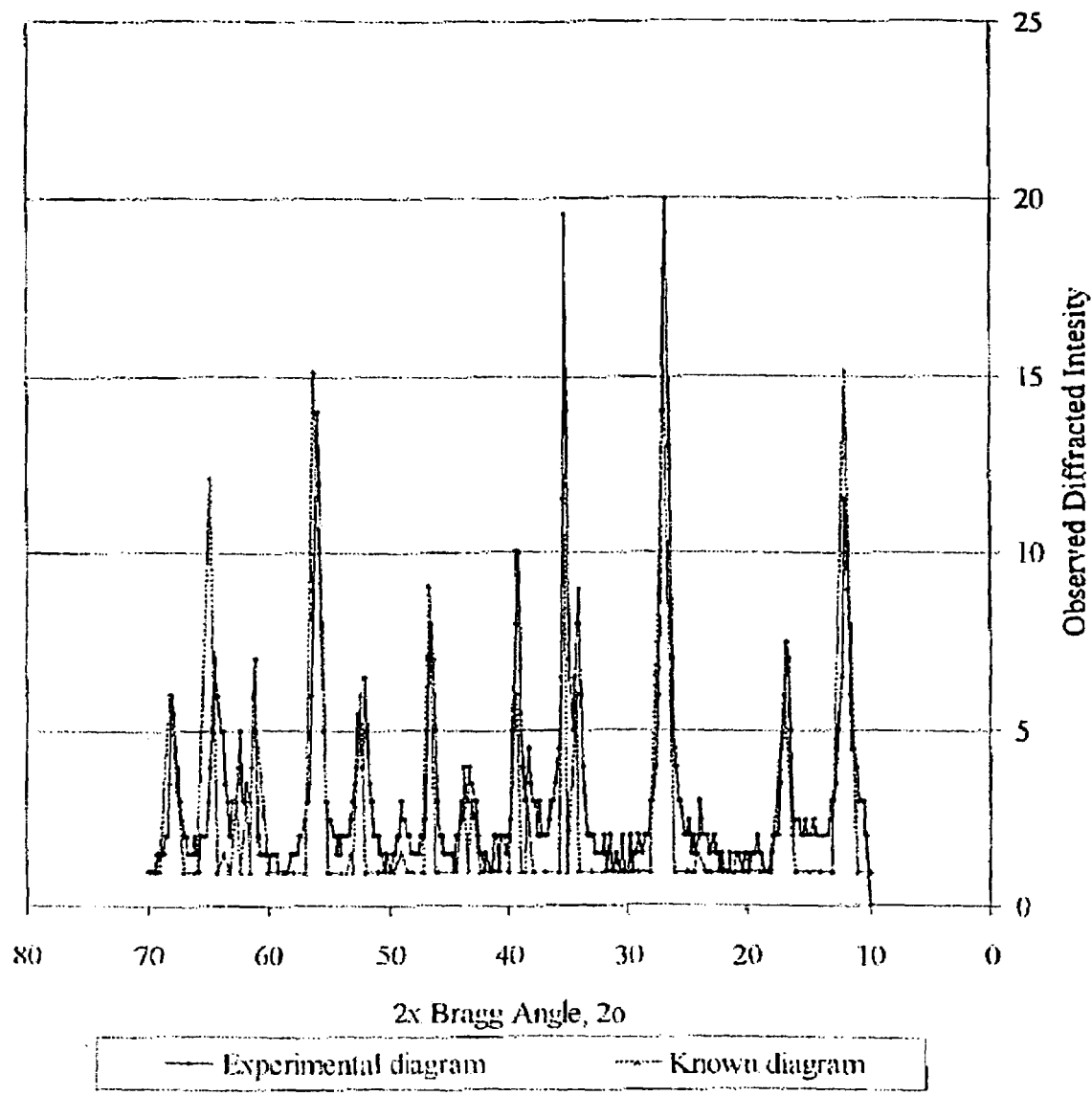
FIG. 1 shows XRD diagrams for akaganeite used in the preferred embodiment of the present invention.

The present invention comprises a method and composition using akaganeite, an iron oxide, as an ion adsorption media for the removal of arsenic from water or other liquids and fluids and affixing it onto carrier media so that it can be used in filtration systems. The media to which akaganeite is affixed may comprise natural or synthetic minerals and various fibrous materials. The resulting porous media can then be used in point of use applications, which offers viable alternatives for small communities to use in lowering the arsenic levels in their drinking water.

Akaganeite in a slurry form is limited to large systems where conventional flocculation followed by sedimentation may be used to remove the saturated adsorbent from water. Therefore, a point-of-use filtration cartridge is ideal for certain households, especially when available technologies such as reverse osmosis and coagulation are excessively expensive. However, akaganeite is fragile and cannot withstand the hydraulic forces in a typical filtration environment. Therefore, preferably porous carrier media are used to fix the akaganeite so that it can be used in filtration devices.

Examples of such media include, but are not limited to, different types of crystalline structure substrates, such as zeolites, pumice, sand, limestone, and sea shells and fibrous materials such as cotton. Although the specification has focused on coating zeolites and cotton with akaganeite, other materials and particles may be coated. The zeolites may be natural or synthetic.

In an alternative embodiment, a filtration medium is used so that drying the akaganeite is not necessary. If drying techniques are used, they should be selected so that they do not destroy the ion adsorption capability of the akaganeite. Because pH is a strong factor affecting the adsorption of akaganeite, pH must be considered when selecting and using the filter media. Drying has a large impact on the arsenate removal capacity—even at neutral final pH the x/m for akaganeite in suspension can be 2 times greater than the optimal x/m reached when using dried akaganeite.

In another embodiment, a wet medium is utilized. Examples of such wet media include cellulose sponges or gel-based media. Also, a sand filter can be implemented as a support medium for a concentrated akaganeite layer. The grain distribution selected should ensure that small akaganeite crystals will be contained and will not be leached into the effluent water.

Preferably, samples of the effluent should be analyzed for both the breakthrough of arsenic and of iron. The media should be effective in the removal of arsenic from the water, but also must not allow the leaching of iron into the solution.

The methods and akaganeite-coated particles of the present invention may also be utilized to remove contaminants from water and other liquids, fluids, and solutions and therefore the invention is not limited to arsenic contaminants or water-based solutions.

The akaganeite used in the present invention is preferably prepared by incubation of a ferric chloride solution. Akaganeite ($\beta$-FeOOH) is preferably prepared by the hydrolysis of an acidic ferric chloride at an incubation temperature of 40° C. for a period of 8 day for small volumes (Schwertmann, C., Cornell, R. M. *Iron Oxides in the Laboratory: Preparation and Characterization* 1991), but the incubation period may be increased when making larger volumes.

The formation of akaganeite is given in the following two-step chemical reaction,

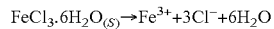

$$FeCl_3 \cdot 6H_2O_{(S)} \rightarrow Fe^{3+} + 3Cl^- + 6H_2O$$

where a reported 27% of iron (Schwertmann and Cornell, 1991) from this first dissociation reaction will precipitate as follows.

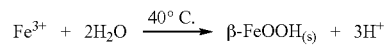

$$Fe^{3+} + 2H_2O \xrightarrow{40°\,C.} \beta\text{-FeOOH}_{(s)} + 3H^+$$

When preparing akaganeite, the pH is preferably below 5 because as the pH increases, the $OH^-$ ion is more competitive than the $Cl^-$ for the structural site in the crystal (Schwertmann and Cornell, 1991).

In the preferred embodiment, a container is utilized to make a given, preferably large, volume of akaganeite suspension. An initial, preferably approximately 0.1 M, iron solution is made by dissolving lump ferric chloride, (FeCl₃.6H2O) in nanopure water at a concentration of preferably approximately 26.9 g/L. The container is incubated at preferably 40° C. for preferably approximately 1 month. After 1 month, the container is preferably stored at ambient temperature, more preferably at 35° C. The solids are harvested, preferably by pumping them from the bottom of the container. The solids are concentrated, preferably using settling cones, but any method of concentrating solids known in the art may be utilized. The akaganeite solids are then preferably concentrated in aqueous solution.

Akaganeite is classified as an iron oxyhydroxide, but can be referred to under the broader category of ferric hydroxides. The hydrolysis method forms somatoid, or cigar shaped, crystals of akaganeite. The crystal structure has a tunnel structure. The halogen ion, along with water molecules, occupies the 0.5 by 0.5 nm$^2$ tunnel in the structure, and are thought to stabilize and even induce the formation of the tunnel structure (Schwertmann and Cornell, 1991) The akaganeite structure is based three layers of close packed anions, with rows of anions absent along the c-axis (Waychunas, G. A. *Oxide Minerals: Petrologic and Magnetic Significance* 1991, 11).

The chlorine ion typically makes up 1% to 7% of the akaganeite content. The amount of the chlorine ion may be reduced by washing or dialysis, but it should be noted that the chlorine ion can provide stability to the tunnel structures (Schwertmann and Cornell, 1991). The tunnels also are known to harbor other ions, such as hydroxyl, fluorine, sulfate and nitrate ions. But it is not clear how much of these species can be taken in by the tunnel structure, or how they compensate for the addition of the anionic species (Waychunas, 1991). Only a single row of absent anions comprises each tunnel, so only species similar in size to $O^{2-}$ can be readily accommodated (Waychunas, 1991).

Color, temperature and pH are all important characteristics of akaganeite. The akaganeite solids have a rusty yellowish-brown appearance. During preparation of akaganeite, the pH must be below 5 because, as the pH increases, the $OH^-$ ion is more competitive for the structural site in the crystal than is the $Cl^-$ ion (Schwertmann and Cornell, 1991). Also, at temperatures above the preferred 40° C. incubation temperature, the akaganeite can transform into other iron oxides, including goethite or hematite (Schwertmann and Cornell, 1991).

Akaganeite in suspension proves to be most effective for arsenic removal based on x/m data. x/m is the mass ratio of arsenic removed to the amount of akaganeite used. The akaganeite in suspension removes arsenic most efficiently at pHs below neutral. Conditions for optimal adsorption by wet akaganeite are in slightly acidic conditions (at a pH of approximately 5).

Akaganeite is preferably applied onto carrier media as it becomes strongly bound to the media and is unlikely to be lost in filtration systems. When the chosen medium is coated with akaganeite, the resulting granular medium is preferably used in point-of-use applications. The akaganeite is preferably dried prior to applying it onto carrier media. As noted herein, the drying temperature significantly affects the quality of the akaganeite's adsorptive capacity. The adsorptive properties of the dried akaganeite decrease with an increase in drying temperature. For example, it has been observed that the adsorptive properties of the akaganeite dried at 60° C. is approximately 5% of akaganeite dried at room temperature. It has been observed that the arsenic removal capacity of dried akaganeite is approximately nine times lower than that of akaganeite in slurry form. When applied onto a zeolite medium, the dried akaganeite's adsorptive capacity has been observed to be approximately 15 times lower than that of akaganeite in slurry (i.e., wet) form. Therefore, temperature is preferably carefully monitored. When dried and powdered akaganeite is utilized, it is preferably dried at approximately ambient temperature as it functions best when dried at ambient temperature.

Although drying temperature affects adsorption, the adsorptive nature of an akaganeite-carrier media matrix does not appear to be significantly affected by pH. The presence of natural ions in tap water is observed to further decrease the removal of arsenic from water by a factor of 2.

In a preferred embodiment, any type of zeolite (such as clinoptilolite) is utilized as the substrate medium to which the akaganeite is attached. The zeolites are preferably sieved, and the zeolites used are preferably those for which the retained mass falls between U.S. standard sieves Nos. 20 and 40. Those zeolites are then collected for akaganeite coating. The zeolite is then preferably washed in a shallow tray with a steady stream of nanopure water for preferably approximately 15 minutes until the rinse water runs clear. The zeolite is then preferably dried in an oven at preferably approximately 100° C. for preferably 24 hours. The zeolites are preferably cooled, preferably in a desiccator. The zeolites are then mixed with the akaganeite solution. Preferably, a ratio of 3.2 g of zeolite to 3.0 ml of akaganeite solution is mixed (i.e., preferably a ratio of 0.037 g akaganeite per 1.0 g zeolite). The concentration of akaganeite in the akaganeite solution can be of any concentration, depending on the efficiency sought, but is preferably of a concentration of between approximately 10,000 and 70,000 mg/L, more preferably 40,000 mg/L. The mixture is preferably rotated for preferably 2 days using any means known in the art such as, for example, a Thumbler's Rock Polisher Model AR-1 with an electric motor, to enhance the process of coating, or adsorbing, the akaganeite onto the zeolite. Following the rotation period, the akaganeite laden zeolite is preferably spread out and dried at preferably ambient conditions under a vacuum hood.

The akaganeite-laden zeolite may then be contacted with an aqueous medium containing arsenic to remove the arsenic, or it can be rinsed with preferably nanopure water prior to such contact with an aqueous medium. Rinsing of the zeolite is preferably performed for approximately 20 minutes under a constant stream of water or until the water runs clear.

As the akaganeite contacts the arsenic containing aqueous medium, the arsenic is adsorbed onto the akaganeite. The akaganeite laden zeolite containing arsenic may then be separated from the aqueous medium utilizing any method known in the art.

In a more preferred embodiment, cotton or other fibrous material is utilized as the carrier medium and adsorption takes place preferably at a pH below neutral. The adsorption process lasts preferably between 24 and 27 hours of exposure, more preferably approximately 6 hours. Langmuir Isotherms of data for differing exposure times showed that the mass of adsorbed solute required to completely saturate a unit mass of adsorbent increased with increased exposure time up to a point somewhere between 24 hours and 72 hours exposure.

The cotton is preferably placed in a container with DI water and akaganeite. The akaganeite is preferably is a suspension of an approximately 20 ppm akaganeite solution acidified with 0.1 N $HNO_3$ The ratio of DI water to the akaganeite solution is preferably 5 to 1. The cotton and akaganeite are mixed preferably by rotation or agitation for preferably approximately 48 hours. The cotton is then either first rinsed, preferably until a yellowish tint is no longer visible in the effluent and for preferably approximately 5 more minutes thereafter then dried in a preferably loosely covered open container, or dried without first rinsing it. Drying is preferably done by incubating the cotton at preferably approximately 35° C. The cotton that is not first rinsed, is rinsed after drying as described herein. The cotton used is preferably a fabric such as a muslin fabric. However, any cotton may be utilized, whether fabric or cotton ball. In another embodiment, an akaganeite-coated string-wound bleached cotton filter is utilized.

Cotton is a cellulosic seed hair fiber (i.e., the fibers grow from seeds formed in pods on the cotton plant). The fiber is a U-shaped tube structure composed of layers of cellulose with a typical length ranging from 1,000 to 3,000 times the diameter, which ranges from 16 to 20 microns (Tortora, P. G., Collier, B. J. *Understanding Textiles* 1997). The cellulosic polymers in cotton have a high degree of polymerization.

The structure of cotton is approximately 70 percent crystalline and 30 percent amorphous (Tortora and Collier, 1997). In its natural state, a cotton fiber has a waxy exterior wall, causing the material to be highly hydrophobic. However, this wall is removed in the ginning process, correspondingly removing the hydrophobicity.

Concentrated mineral acids and oxidizing agents are preferably controlled as they will degrade and destroy the cotton fiber. Conversely, bases do not show a strong effect, and strong bases actually cause the cotton fiber to swell and strengthen (Tortora and Collier, 1997).

In another embodiment, limestone is utilized as the carrier medium. Limestone chips are preferably prepared by crushing concrete. The chips are preferably sieved. The masses retained are preferably those between U.S. standard sieves Nos. 10, 20, 30, and 40. The limestone chips are preferably rinsed with nanopure water for preferably at least approximately 5 minutes. The chips are then dried, preferably in an oven and more preferably for approximately 48 hours in an oven set at 100° C. The chips are then cooled and exposed to akaganeite. After exposure to akaganeite, the chips are preferably rinsed and dried by a variety of methods known in the art. Rinsing steps are preferably performed using DI water until the yellowish tint is no longer noticeable in the rinse effluent and preferably for at least approximately 5 additional minutes thereafter.

In another embodiment, sea shells are utilized as the carrier medium. Sea shell chips are preferably prepared by first crushing them. The chips are preferably sieved. The masses retained are preferably those between U.S. standard sieves Nos. 10 and 20. The limestone chips are preferably rinsed with nanopure water for preferably at least approximately 5 minutes. The chips are then preferably incubated, and preferably at approximately 35° C. Incubation preferably lasts approximately 2 weeks. The chips are then exposed to akaganeite, preferably by exposing them to an approximately 1 part stock akaganeite solution per 3 parts DI water and mixed for preferably approximately 48 hours. The stock akaganeite solution is preferably an approximately 20 ppm solution acidified with 0.1 N $HNO_3$. The chips are then preferably rinsed with DI, preferably until the yellowish tint is no longer noticeable in the rinse effluent and for preferably approximately 5 additional minutes thereafter. The chips are then placed in a loosely covered open container and preferably incubated at approximately 35° C. for drying and storage.

EXAMPLES

The invention is further illustrated and exemplified by the following experimental protocols and results utilizing zeolites and cotton as the carrier media.

Tests Utilizing Zeolites

I. Chemicals and Media Preparation

A. Akaganeite Suspension

A 55-gallon (approximately 208 liter) blue high-density plastic container from the Grief Bros. Industrial Shipping Corporation was utilized to make a large volume of akaganeite suspension. As instructed by Schwertmann and Cornell (1991), an initial 0.1 M iron solution was made by dissolving Fisher brand lump ferric chloride, ($FeCl_3.6H_2O$) in nanopure water at a concentration of 26.9 g/L. The barrel was incubated at 40° C. for approximately 1 month, after which it was stored at ambient temperature. During the 40° C. incubation, a yellowish orange precipitate was formed, and the pH of the suspension dropped to approximately 1.5. Somatoid, or cigar shaped, crystals were formed. The crystals were approximately 30 nm to 1 um in length as a result of frequently twinned crystals (Schwertmann and Cornell, 1991). The solids were pumped from the bottom of the drum using a PVC pipe extension on a peristaltic pump. Using a set of 3 settling cones, the solids were concentrated, and the supernatant was pumped off the top and returned to the original 55-gallon container. The aqueous suspension of concentrated akaganeite solids was used in the various sets of batch tests.

B. Arsenate Solution

An arsenate solution was prepared using a SPEX brand plasma grade standard of 1000 mg/L or ppm arsenic. The standard was made with ultra pure arsenic metal dissolved in nanopure water and stored with 5% nitric acid. The standard was understood to be in the +5 oxidation state because the solution was in contact with atmospheric oxygen. A 1 L stock arsenate solution of 20 ppm was made by diluting 20 mL of the 1000 ppm standard in nanopure water. The 20 ppm stock arsenate solution was acidified with 0.1 N $HNO_3$ and was used in various dilutions for the series of batch tests.

C. Iron Standards

Iron standards were prepared using HACH brand 100 mg/L or ppm. The standard was diluted to concentrations of 0.4 ppm, 0.8 ppm, and 1.2 ppm. The iron standards were used to determine the accuracy and precision of a HACH DR/2000 direct reading, colorimetric spectrophotometer.

D. Coated Zeolite

Zeolite, obtained from the Zeotech Corporation, was utilized to attach the akaganeite crystals. The zeolite was of the type called Tilden Clinoptilolite. It is naturally occurring in the area around Tilden, Tex. Table 1 shows representative analytical data provided by the Zeotech Corporation.

TABLE 1

Analytical Data for Zeolite Used In Tests

| Zeolite | CEC, meq/100 g | $SiO_2$, wt. % | $Al_2O_3$, wt. % | $Fe_2O_3$, wt. % | $CaO_3$, wt. % | $Na_2O_3$, wt. % |
| --- | --- | --- | --- | --- | --- | --- |
| Tilden | 113 | 66.81 | 12.71 | 0.86 | 1.60 | 0.90 |

The zeolite was sieved, and the mass retained between U.S. standard sieves Nos. 20 and 40 was collected for akaganeite coating. The zeolite was then washed in a shallow tray with a steady stream of nanopure water for approximately 15 minutes until the rinse water ran clear. The zeolite was dried in an oven at 100° C. for 24 hours. After cooling in a desiccator, a total of 320 grams of the zeolite were combined with 300 mL of the akaganeite suspension at a concentration of 40,000 mg/L. The mixture was rotated for 2 days using a Thumbler's Rock Polisher Model AR-1 with an electric motor to enhance the process of coating the zeolite with akaganeite. Following the rotation period, the coated zeolite was spread onto a shallow tray and dried at ambient conditions under a vacuum hood. The akaganeite-coated zeolite was divided into two equal masses. One was left unaltered, and the second was rinsed in a shallow tray with a constant stream of nanopure water. The rinsing of the second set of coated zeolites continued for approximately 20 minutes until the yellow tinted rinse water ran clear. A mass degradation test and iron determination test were performed on both sets of coated zeolite.

II. Experimental Procedures

A. X-Ray Powder Diffraction

After the one month, 40° C. incubation of the ferric chloride solution, a sample of the precipitate material was tested by X-ray powder diffraction. The X-ray diffraction (XRD) instrument developed a diagram for the iron oxyhydroxide solid. The values at the different peaks in the diagram relate to two times the Bragg angle, $\phi$, which is the angle at which X-rays enter and leave the crystal (Schwertmann and Cornell, 1991). An equation and experimental variables were used to determine the experimental lattice spacing, d-value, in the crystalline solid, and the experimental values were compared to literature values. The following Bragg equation defines this relationship (Schwertmann and Cornell, 1991), $$n\lambda = 2 d_{hkl} \sin \phi$$

where $\lambda$ is the wavelength of the X-rays used ($\lambda = 1.5405$ Angstroms). The Bragg angle, $\phi$, is the angle at which the X-rays strike the crystal. The maximum interference intensity is seen at $d_{hkl}$ (i.e., d-value, the distance between the set of hkl planes in the crystal, known as the lattice spacing. Finally, n is the order of the reflection (n=1).

To obtain a dried powder sample of the precipitated solids, the aqueous suspension was vacuum filtered for 24 hours using a 0.45 μm membrane filter until all moisture was evaporated from the solid remaining on the membrane. An XRD analysis was performed on the sample taken off the filter membrane. The XRD analysis was conducted using a Rigaku Gegerflex instrument.

B. Measurement of Arsenic Concentrations

The arsenic concentrations of all samples were determined using a Perkin-Elmer 5000 graphite furnace atomic absorption spectrophotometer (GF-AAS). The measurements from the GF-ASS are independent of the oxidation state of the arsenic. A small volume of the arsenic standards and samples were delivered to the graphite furnace via an auto-sampler, and three absorbance measurements and an average were determined for each standard and sample. The absorbance readings were fitted to a linear model by plotting the values against the standard arsenic concentrations, and the unknown concentration of the samples were interpolated from the linear relationship.

C. Optimization of pH

Because the arsenate solution was stored with 0.1 N $HNO_3$, the solution had to be neutralized using the required amount of base (1 N NaOH). The solution was continuously mixed and pH was measured using an Orion Model 410 SureFlow electrode pH meter. The pH of the akaganeite was also altered between 2.0 and 8.0 in pH increments of 0.5 by adding 1 N NaOH. The final pH was a measure of the combined pH of the suspension after the treatment and centrifugation periods.

Optimum pH batch tests were conducted using 50 mL plastic centrifuge tubes filled with the measured volume of arsenate solution. Two to three of the tubes were left untreated and marked as the zero, or initial, arsenic concentration. A predetermined volume of a suspension of known akaganeite concentration was added to the arsenic solution in the remaining centrifuge tubes. The suspension was then mixed by mechanical rotation at 20 rpm for one hour. The samples were then centrifuged at 2,000 rpm for 10 minutes, then vacuum filtered using 0.45 μm Fisher brand membrane filters. A final pH of the filtrate was recorded for each sample. The filtrate and zero concentrations were collected in small plastic sampling bottles and acidified with 0.1 N $HNO_3$. The concentration of the untreated arsenic and of the final, treated samples were determined using a GF-AAS.

An analysis of date was performed using the initial and final concentrations of the arsenate solution and other experimental parameters. The removal efficiency and the x/m ratio, which is equivalent to the mass of arsenic removed per unit mass added, were calculated. In preliminary tests with only 25 minutes of exposure time, it was found that the x/m of treatment with akaganeite in suspension was very dependent on pH. The one-hour data was plotted as x/m ratio versus final pH, and a polynomial trend was fitted to the plot.

D. Optimization of Drying Temperature

Akaganeite samples were dried at ambient temperature, 30° C., 40° C., 50° C., and 60° C. At the lower temperatures of 30° C. and 40° C., the akaganeite was dried in a programmable incubator. A constant temperature oven was used for the higher temperatures. Pre-weighed crucibles were filled with a volume of the akaganeite suspension and weighed every 24 hours, until the mass change was less than 1%. The dried samples were pulverized using a pestle and mortar and stored in sealed plastic bags.

The batch tests were conducted using the same procedure and techniques described for the optimization of pH tests. However, the akaganeite was added by predetermined weight of a dried powder sample. Again, the initial and final arsenic concentration of the samples were determined by GF-AAS. Removal efficiency and x/m were calculated for all samples. The data analysis was preformed using a single factor analysis of variance (ANOVA) which was based on the removal efficiency of the akaganeite at each of the drying temperatures.

E. Iron Determination

Determination of the total iron concentration was necessary for different determinations throughout the experiments. Colorimetric methods to detect iron concentration, using the FerroVer Method with powder pillows, were preformed on the HACH DR/2000, a direct reading spectrophotometer. All samples were in solution, and diluted in 250 mL volumetric flask to read within the instrument's range of 0 to 3.00 mg Fe/L.

Total iron concentration of the $FeCl_3$ solution was determined to estimate the efficiency of the akaganeite formation. A sample of the supernatant from the 55-gallon container was pumped out into a 50 mL centrifuge tube. The solution was then centrifuged for 30 minutes and filtered with 0.45 μm membrane filters to remove any solids. The solution was diluted and analyzed for total iron concentration. Because this was a closed system, a mass balance of iron was performed. Efficiency (i.e., the percentage of iron that precipitated into akaganeite) was calculated as the difference between the initial iron concentration in the solution and the concentration after the incubation period.

Next, a set of three samples from each stage of the akaganeite-coated zeolite was combined with undiluted HCl to obtain the iron content in solution. A total of 25 mL of HCl was mixed with 2 grams of the coated zeolite, and the solution was filtered to remove turbidity. The solution was diluted and analyzed for the total iron concentration. The mass of akaganeite was calculated using the molecular formula (β-FeOOH), which contains one mole of iron per mole of solid. The average mass ratio of akaganeite to zeolite was then calculated by dividing the mass of the akaganeite mass by the mass of the coated zeolite.

F. Mass Degradation Tests

Mass degradation tests were conducted for three phases of akaganeite development, including ambient dried pure akaganeite, and both stages of the akaganeite-coated zeolites. The same procedure was followed for each test. A measured amount of the solid being evaluated was placed in a pre-weighed 12 mL HACH glass test tube, and the tube was filled with nanopure water. After capping the tubes, they were rotated on a rotary mechanical mixer for a designated duration of from 0 to 2 days. A total of three tubes were taken at each time increment and centrifuged for 10 minutes at 2,000 rpm to produce a supernatant free of suspended solids. The supernatant was carefully removed using a 10 mL pipette. The settled solids were left in the glass test tube and dried in the oven at 50° C. for 5 days and then cooled in a dessicator. The final weights of the tubes were measured, and the final weights of the solid were determined. An average percentage of mass retained was calculated by comparing the initial amount of akaganeite solid to the final weight of the solids.

The supernatant for the first two mass degradation tests, using ambient dried akaganeite and the initial pre-rinsed coated zeolite, had an obvious yellow tint. This helped indicate the presence of dissolved iron in the supernatant during these two tests. However, the last mass degradation test was completed using the rinsed akaganeite-coated zeolite. The supernatant that was removed from these sets of test tubes appeared clear, so the samples were analyzed with the spectrophotometer for total iron concentration. At all time increments for the rinsed coated media, no iron concentration was detectable in the supernatant.

G. Arsenate Removal Tests

Because the mass degradation tests showed that there was no detectable leaching of iron, the rinsed portion of the akaganeite-coated zeolite was used for a series of batch tests. Arsenate solution to be treated was adjusted to a pH of near 7, and then near 6, and finally utilizing the campus tap water. The arsenate solutions with pH near 6 and 7 were made with de-ionized (DI) water. Various amounts of the coated media were weighed, and using the mass ratio determined in the iron analysis, a dose of akaganeite was determined. Akaganeite dosage was increased from 24.0 mg/L to 96.0 mg/L. Again, a one-hour exposure time was achieved using mechanical rotation in 50 mL plastic centrifuge tubes. The substrate media was removed from the water by vacuum filtration with membrane filters. The final pH of the filtrate was recorded and the sample was then acidified with 0.1 N $HNO_3$. An untreated arsenic concentration and final arsenic concentration of the treated samples were determined in the Chemistry Department on the GF-AAS.

The tap water batch tests were conducted using water at the New Mexico State University campus. The table shown in Table 2 contains the water quality parameters of the campus tap water and were provided by the NMSU Facilities and Service Department.

TABLE 2

Water Quality Parameters of Tap Water Used In Tests

| Element | Result | Units | Maximum Detection Level (MDL) |
| --- | --- | --- | --- |
| Antimony | Less than | Mg/L | 0.4 |
| Arsenic | 1.3-5.9 | Mg/L | 0.3 |
| Barium | 59.5 | Mg/L | 0.1 |
| Chromium | 0.5 | Mg/L | 0.1 |
| Mercury | Less than | Mg/L | 0.2 |
| Nickel | 2.2 | Mg/L | 0.05 |
| Lead | 0.4 | Mg/L | 0.1 |
| Copper | 2.9 | Mg/L | 0.4 |
| Iron by ICP- | 0.21 | Mg/L | 0.05 |
| Manganese by ICP- | 0.06 | Mg/L | 0.02 |
| Calcium by ICP- | 23.9 | Mg/L | 0.1 |
| Mangnesium by ICP- | 5.8 | Mg/L | 0.1 |
| Potassium by ICP- | 6.2 | Mg/L | 0.1 |
| Sodium by ICP- | 99.0 | Mg/L | 0.1 |
| Hardness as $CaCO^3$— | 84 | Mg/L | 1 |
| Alkalinity as $CaCO^3$— | 150.0 | Mg/L | 0.1 |
| Carbonate | 0.00 | meq/L | 0.01 |
| Carbonate Alkalinity | 0.0 | Mg/L | 1.0 |
| Bicarbonate | 3.00 | Meq/L | 0.01 |
| Bicarbonate Alkalinity | 183.0 | Mg/L | 1.0 |
| Chloride | 52.4 | Mg/L | 0.5 |
| Fluoride | 0.83 | Mg/L | 0.05 |
| Sulfate | 82 | Mg/L | 2 |
| Electrical Conductivity | 616 | μmhos/cm | 1 |
| pH | 7.65 | | |
| Total Dissolved Solids | 384 | mg/L | 1 |
| Nitrate/nitrite as N | 0.07 | mg/L | 0.05 |

The samples were analyzed on Aug. 16, 1999. Using initial and final concentrations of the arsenate solution, and other experimental parameters, an analysis of the data was performed. The removal efficiency and x/m, which is equivalent to the unit mass of arsenic removed per unit mass of akaganeite added, were again calculated.

H. Adsorption Isotherm

A Langmuir adsorption isotherm was hypothesized for the plotted relationship between the final or equilibrium arsenic concentration and the x/m ratio. The main assumptions of the Langmuir isotherm are that there are a fixed number of sites on the absorbent (i.e., akaganeite), allowing a layer of solute (arsenate) one molecule thick, that equilibrium conditions are achieved, and that the adsorption process is reversible. The empirical constants, a and b, can be solved by plotting equilibrium concentration divided by x/m versus the equilibrium concentration and the following equation, $$C_e/(x/m) = 1/(ab) + 1/a \cdot C_e$$

where $C_e$ is the equilibrium concentration of contaminant, x/m is the mass ratio of amount absorbed to absorbent, and a and b are the constants—a describes the mass of adsorbed solute required to completely saturate a unit mass of adsorbent. Because there was insufficient data in the lower range of equilibrium arsenic concentration, Langmuir isotherms were not completed for the near neutral pH test and the tap water test using the coated zeolite. However, the Langmuir isotherm was completed for the test of pH of approximately 6.0.

III. Results

A. Akaganeite Characterization

1. X-Ray Powder Diffraction

The ferric iron suspension made in the laboratory was sampled about one month after initializing the incubation period at 40° C. The sample was vacuum filtered and the solids were allowed to dry at ambient temperature. The solids on the filter were pulverized and collected for the X-ray diffraction (XRD) analysis. The akaganeite produced in the laboratory was positively identified by comparing the known d-values, the spacing between atomic planes, and the intensities of the peaks to the d-values and peaks obtained from the XRD diagram. Table 3 shows the digitized XRD diagram generated by the analysis of the laboratory akaganeite, and the known XRD pattern for akaganeite.

TABLE 3

XRD Patterns and Values For Akaganeite

| Spacing, d-value, Angstrom | 2x Bragg Angle, 2θ, degree | Experimental XRD Peak, 2θ$_{exp}$, degree | Experimental d-value, Angstrom | Percent Error in d-values |
|---|---|---|---|---|
| 7.400 | 11.95 | 11.9 | 7.431 | 0.4% |
| 5.250 | 16.87 | 16.8 | 5.273 | 0.4% |
| 3.700 | 24.03 | 23.9 | 3.720 | 0.5% |
| 3.311 | 26.90 | 26.7 | 3.336 | 0.8% |
| 2.616 | 34.25 | 34.1 | 2.627 | 0.4% |
| 2.543 | 35.26 | 35.2 | 2.547 | 0.2% |
| 2.343 | 38.39 | 38.3 | 2.348 | 0.2% |
| 2.285 | 39.40 | 39.3 | 2.291 | 0.2% |
| 2.097 | 43.10 | 43.3 | 2.088 | −.04% |
| 2.064 | 43.82 | 43.7 | 2.070 | 0.3% |
| 1.944 | 46.68 | 46.5 | 1.951 | 0.4% |
| 1.854 | 49.10 | 49.1 | 1.854 | 0.0% |
| 1.746 | 52.35 | 52.0 | 1.757 | 0.6% |
| 1.719 | 53.24 | 52.9 | 1.729 | 0.6% |
| 1.635 | 56.21 | 55.9 | 1.643 | 0.5% |
| 1.515 | 61.12 | 61.1 | 1.515 | 0.0% |
| 1.497 | 61.93 | 62.1 | 1.493 | −0.2% |
| 1.480 | 62.72 | 62.4 | 1.487 | 0.5% |
| 1.459 | 63.73 | 63.0 | 1.474 | 1.0% |
| 1.438 | 64.77 | 64.4 | 1.445 | 0.5% |
| 1.374 | 68.19 | 68.0 | 1.377 | 0.2% |

The XRD peaks in Table 3 directly correspond to double the given Bragg angle. The experimental d-value was calculated using the peak values from the XRD diagram and the relationship in the Bragg equation. The expected d-values and Bragg angles versus those calculated from the x-ray powder diffraction analysis are provided in FIG. 1.

The XRD was preformed once, and the percent error between the known d-values, the lattice spacing of akaganeite, to those determined are given in the last column of Table 3. None of the errors between the known d-values and experimental values exceeded 1%. Based on a low percentage of error, the comparison of the XRD diagrams and other characteristics, the iron oxyhydroxide produced in the laboratory was identified as akaganeite.

2. Akaganeite Suspension Properties

The akaganeite suspension produced in the 55-gallon container incubated at 40° C. was periodically harvested and certain properties were recorded. A sample of the supernatant solution was taken after a period of one month. To produce a supernatant free of akaganeite, centrifuging and filtering the supernatant was completed to remove any solids. The total iron concentration of the filtrate was determined. Based on a mass balance of iron, the yield of akaganeite was calculated. The one-month yield of 21.1% was similar to the expected yield of 27% reported by Schwertmann and Cornell (1991). Dilution of the initial solution over a period of 18 months of harvesting the akaganeite should lead to an increased efficiency of the total iron precipitated. The average values for properties of the akaganeite suspension are reported in Table 4. The pH and color of the precipitate also helped characterize the iron oxyhydroxide precipitate as akaganeite.

TABLE 4

Properties of the Akaganeite Suspension

| | Average Value |
|---|---|
| Color of precipitate | Orange brown |
| pH | 1.5 |
| Initial iron concentration in ferric chloride solution | 5560 mg Fe/L |
| Average 1 month iron concentration in filtrate | 4385 mg Fe/L |
| Percent yield at 1 month | 21.1% |

A concentrated suspension of akaganeite was pumped out of the bottom of the plastic drum and collected in a separate container for use in all the batch tests. The concentrated suspension of akaganeite was also used in suspension, dried at different temperatures, and finally combined with zeolite to make a coated carrier medium. Some of the characteristics for this suspension are an average akaganeite concentration (total suspended solids) of 40,000 mg/L and an average pH of 1.7. The pH of the concentrated akaganeite suspension showed a slight increase of 0.2 from the barrel akaganeite, possibly due to the decreased amount of supernatant which contained $H^+$ and $Cl^-$.

B. Arsenate Removal Optimization Tests

1. Optimization of pH

Batch tests were conducted with pH adjusted akaganeite samples to determine the optimum pH range for the maximum removal of arsenic. A neutralized pH solution of approximately 500 ppb arsenate was used in each of the tests. First, a screening test was conducted with the concentrated akaganeite at an unaltered pH of 1.7, and at an adjusted pH of 6.6. These tests were used to determine if pH had an effect on arsenic removal. Twenty-five minutes of exposure time was provided using mechanical rotation. The results indicated pH dependence, so a second set of batch tests were done with an increased exposure time of 1 hour. The initial pH of concentrated samples of akaganeite were adjusted within a pH range of 2.0 to 8.0 in pH increments of 0.5. The final pHs of the combination of the neutralized arsenate solution and the varying pH akaganeite suspensions were measured and recorded after the one-hour detention time. Because nanopure, or de-ionized, water was used in the batch tests, the buffer capacity was practically eliminated, and a final pH range of 4.0 to 8.0 was achieved. Table 5 shows the summary of results, including the final pH, akaganeite dosage, and x/m.

TABLE 5

Results for the Removal of Arsenic Using Akaganeite In Suspension

| Final pH | pH of As (V) soln. | Ph of Akaganeite Suspension | Initial As Conc., ppb | Final As Conc., ppb | Does of Akaganeite, mg/L | x/m, mg AS/g Ak |
|---|---|---|---|---|---|---|
| 4.87 | 7.14 | 2.06 | 473 | 8 | 4.0 | 118 |
| 5.00 | 7.14 | 2.48 | 473 | 24 | 4.0 | 114 |
| 5.07 | 7.14 | 2.48 | 473 | 38 | 4.0 | 110 |
| 5.47 | 7.14 | 2.06 | 473 | 21 | 4.0 | 114 |

TABLE 5-continued

Results for the Removal of Arsenic Using Akaganeite In Suspension

| Final pH | pH of As (V) soln. | Ph of Akaganeite Suspension | Initial As Conc., ppb | Final As Conc., ppb | Does of Akaganeite, mg/L | x/m, mg AS/g Ak |
|---|---|---|---|---|---|---|
| 6.29 | 7.14 | 3.02 | 473 | 76 | 4.0 | 100 |
| 6.30 | 7.14 | 3.02 | 473 | 86 | 4.0 | 98 |
| 6.45 | 7.01 | 5.52 | 254 | 58 | 4.0 | 50 |
| 6.83 | 7.01 | 5.03 | 254 | 71 | 4.0 | 46 |
| 6.84 | 7.01 | 5.03 | 254 | 74 | 4.0 | 46 |
| 6.84 | 7.01 | 5.52 | 254 | 34 | 4.0 | 56 |
| 6.91 | 7.23 | 4.01 | 301 | 175 | 4.0 | 32 |
| 6.94 | 7.23 | 3.55 | 301 | 171 | 4.0 | 33 |
| 6.95 | 7.23 | 4.52 | 301 | 160 | 4.0 | 36 |
| 7.03 | 7.23 | 4.52 | 301 | 151 | 4.0 | 38 |
| 7.11 | 7.23 | 3.55 | 301 | 174 | 4.0 | 32 |
| 7.14 | 7.23 | 4.01 | 301 | 164 | 4.0 | 35 |

Figure 2:
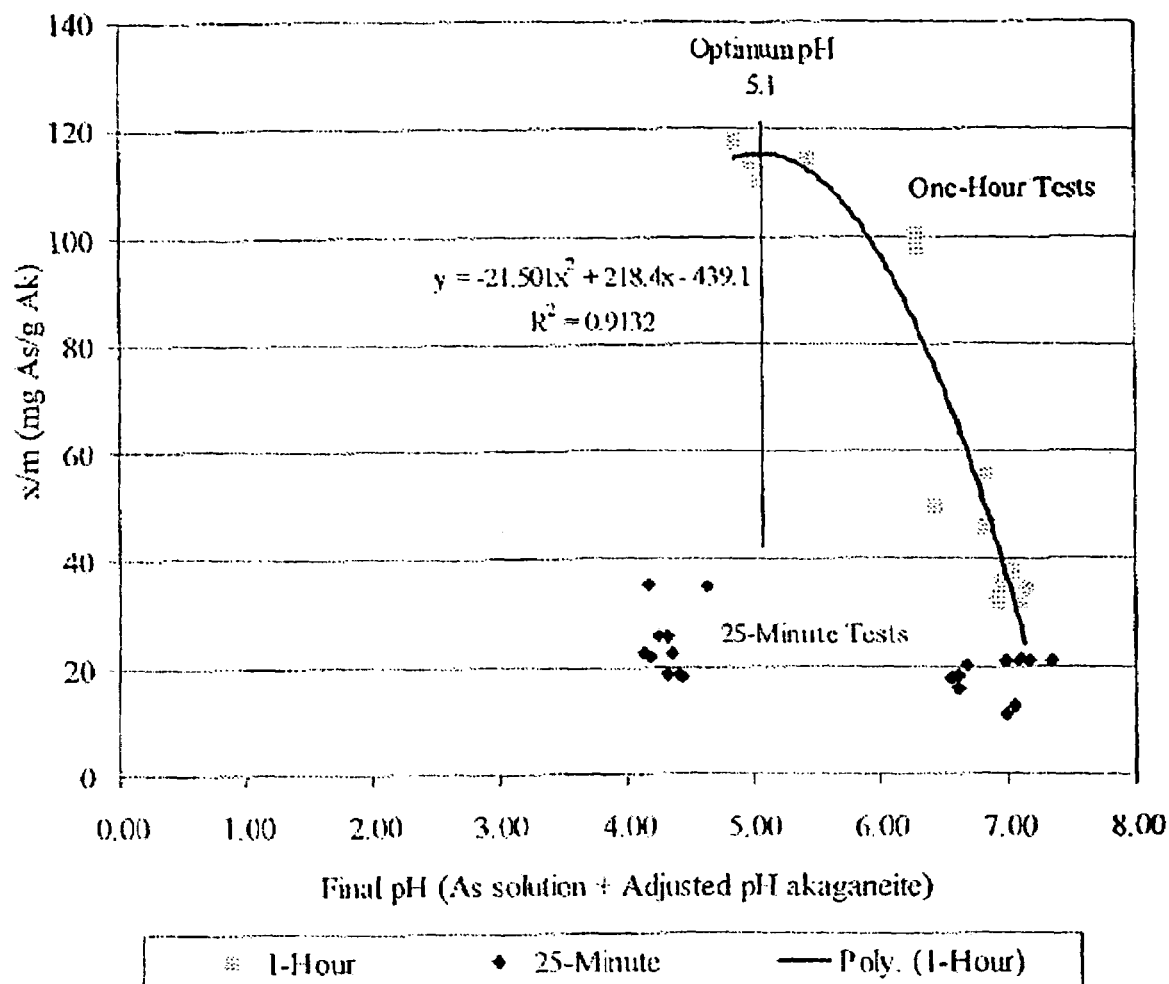
FIG. 2 shows pH optimization data for the use of akaganeite in suspension.

The effect of the final pH on the ratio of the mass of arsenic removed, x, to the mass of akaganeite used, m, was evaluated over the final pH range of 4.0 to 8.0. Based on the parabolic trend in the data and the given polynomial equation, the highest x/m ratio of 118 mg akaganeite per gram arsenic occurs at the optimum pH of 5.1. FIG. 2 shows the results and the polynomial expression.

The 25-minute tests were not included in the evaluation of the optimum pH. The exposure time was different than that of the one-hour tests, so the data did not have the same parameters and could not be compared with the other points on the plot. However, these initial tests indicated that arsenic removal using akaganeite treatment is pH sensitive, and the one-hour tests further explored the results over a range of final pH, as seen in FIG. 2.

Adsorption isotherm plots of x/m versus equilibrium arsenic concentrations were made based on the data. The resulting plots did not represent any of the isotherm models. The plots did not display a predictable trend because of the strong dependence of arsenic removal on pH and therefore were not evaluated by adsorption isotherm models.

2. Optimization of Drying Temperature

Temperature at which to dry the akaganeite was optimized by conducting a series of one-hour detention time batch tests. The concentrated akaganeite was dried at increasing temperatures from ambient (~22° C.) to 60° C., at increments of 10° C. The dried and powdered akaganeite was added to a neutral-pH arsenate solution to determine the removal efficiency at each drying temperature. A total of 5 samples were evaluated at each drying temperature. The summary of results including the average x/m, average percent arsenate removal for each drying temperature, and the standard deviations are reported in Table 6.

TABLE 6

Results for the Removal of Arsenic Using Akaganeite In Suspension

| Temperature | Akaganeite Dose, mg/L | Final pH | Initial Arsenic Conc., ppb | Average x/m, mg AS/g AK | Average Removal Efficiency | Standard Deviation |
|---|---|---|---|---|---|---|
| Ambient (~22° C.) | 20 | 6.77 | 234 | 11.4 | 100% | 0.0% |
| 30° C. | 20 | 6.70 | 220 | 10.5 | 94% | 1.7% |
| 40° C. | 20 | 6.83 | 205 | 6.7 | 80% | 5.3% |

TABLE 6-continued

Results for the Removal of Arsenic Using Akaganeite In Suspension

| Temperature | Akaganeite Dose, mg/L | Final pH | Initial Arsenic Conc., ppb | Average x/m, mg AS/g AK | Average Removal Efficiency | Standard Deviation |
|---|---|---|---|---|---|---|
| 50° C. | 20 | 6.88 | 322 | 13/7 | 85% | 9.6% |
| 60° C. | 18 | 6.55 | 199 | 0.5 | 5% | 4.5% |

A single factor analysis of variance (ANOVA) was used to evaluate the effects of drying temperature on the removal efficiency of arsenate in the batch tests. The F statistic and p values given in the ANOVA table were used to test the hypothesis that there is no difference in the removal efficiency during the treatment process using powdered akaganeite dried at different temperatures. Table 7 shows the ANOVA results for the dried akaganeite at the varying temperatures where the confidence level is 95%, or a equals 0.05.

TABLE 7

ANOVA Results for the Efficiency of Dried Akaganeite

| Source of Variation | Sum of Squares | Degrees of Freedom | Mean Square | $F_{test}$ | $F_{critical}$ | p Value |
|---|---|---|---|---|---|---|
| Treatment | 3.01 | 4 | 0.75 | 264.5 | 2.9 | 5.2E-17 |
| Error | 0.06 | 20 | 0.003 | | | |
| Total | 3.07 | 24 | | | | |

The F test statistic value of 264.5 greatly exceeded the F critical value of 2.9, which indicated that there was a significant difference in the treatment processes of the batch tests. The low p-value of 5.2E-17 also suggested the rejection of the hypothesis that there is no difference in the treatment processes. Therefore, akaganeite dried at ambient conditions has a clear advantage in the arsenate removal process compared to that dried at the other temperatures.

C. Akaganeite Coated Media

1. Media Properties

Tilden zeolite was used to fix the akaganeite crystals to a larger and more durable media. The Tilden zeolite was sieved to a 20/40 grade. Two stages of the akaganeite-coated zeolites were analyzed. First, the washed and dried zeolites were coated with the concentrated akaganeite solution by simply rotating a volume of concentrated akaganeite suspension with a mass of the zeolite for a period of 2 days. The coated zeolite was then allowed to dry at ambient temperature. Second, a portion of the original coated zeolite was continuously rinsed in a shallow tray with a steady stream of DI water to remove the soluble iron and other ions. Based on the mass of zeolites used, and the volume and concentration of akaganeite suspension (40,000 mg/L), a preliminary ratio of 0.037 grams of akaganeite per gram of zeolite was calculated (i.e., 3.7% of the coated zeolite was akaganeite). The results in Table 8 provide the ratio of akaganeite to zeolites for the pre-rinsed sample and for the rinsed sample.

TABLE 8

Akaganeite Content of the Zeolites Used In Tests

| Type of Coated Zeolites | Average Akaganeite to Zeolite Ratio | Standard Deviation |
| --- | --- | --- |
| Pre-Rinsed 20/40 Tilden | 0.049 g Ak/g Zeolite | 0.0037 g/g |
| Rinsed 20/40 Tilden | 0.024 g Ak/G Zeolite | 0.0011 g/g |

The akaganeite to zeolite ratio was determined by using mass balance of iron. Three equivalent amounts of each class of coated zeolite were sampled. The coated zeolite was acid washed to dissolve the iron, and the supernatant was then filtered. The filtrate was analyzed for total iron. Given the concentration of iron in solution and volume of the solution, the mass of iron that coated the zeolites was calculated. The mass of iron is related to the mass of akaganeite (β-FeOOH) based on the molecular mass content and the ratio of molecular weights, which is one mole of iron per mole of solid akaganeite. As seen in Table 8, the rinsing process decreased the mass ratio by about half. This is largely due to the loss of soluble iron, which does not contribute to akaganeite mass, and which was rinsed off during the washing process.

2. Mass Degradation

Figure 3:
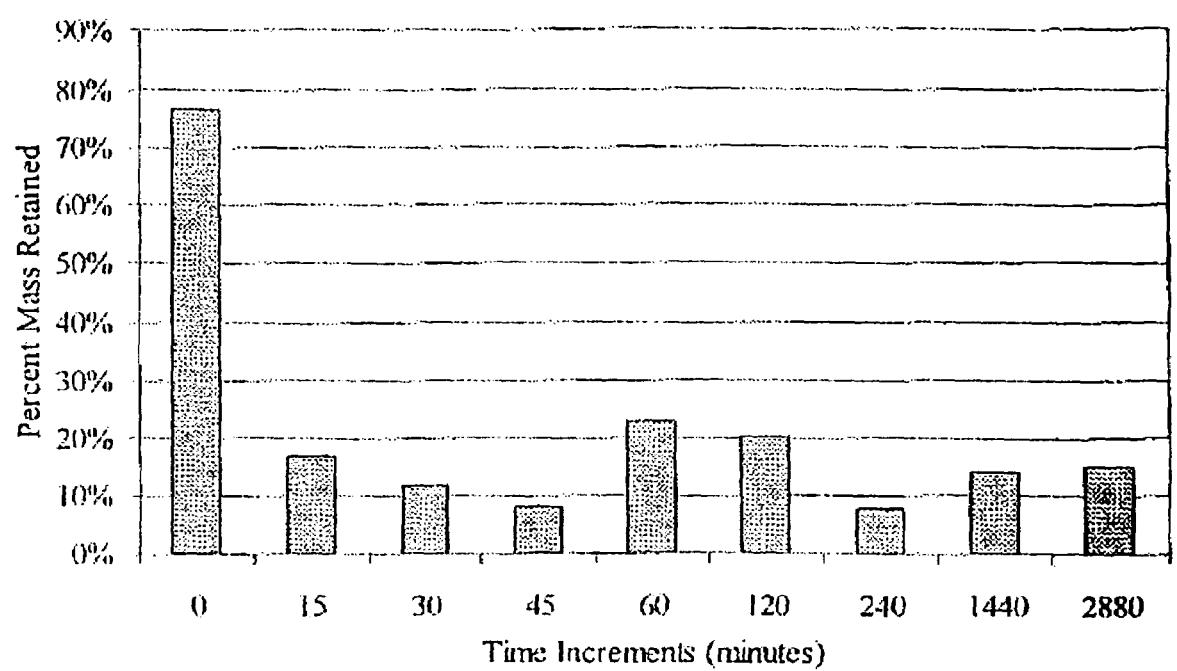
FIG. 3 shows data of the average mass retained of dried akaganeite over time.

Mass degradation tests were conducted on akaganeite flakes dried at ambient temperature, the pre-rinsed akaganeite coated zeolites, and the rinsed akaganeite coated zeolites. First, a known mass of dried flakes of akaganeite were added to pre-weighed test tubes with DI water and then evaluated at different time increments ranging from 0 to 2,880 minutes. Equivalent masses of akaganeite were mechanically turned, then they were removed at each of the time increments and centrifuged. The supernatant was drained off, and solids were dried and weighed to determine the percent of solids remaining. FIG. 3 provides the average percent of solid mass retained over the time intervals. A large decrease in mass of solids retained, over 80%, was observed after time zero. This is largely a result of loss of iron in solution, possibly as dissolved ferric chloride. This was confirmed by visual observation of the supernatant, which at all time intervals had a noticeable, yellow tint.

The percentage of mass retained of the ambient dried akaganeite showed a large initial decrease in mass and varied slightly throughout the remaining time based on FIG. 3. This is largely a result of the varying amounts of soluble iron in the original dried samples. However, once fixed to the zeolites, the results for the mass degradation test became much more consistent over the entire time period. The second mass degradation test was conducted using the pre-rinsed akaganeite coated zeolites. The average percentage of mass retained is given in FIG. 4 over the time range of 0 to 5,775 minutes.

Figure 4:
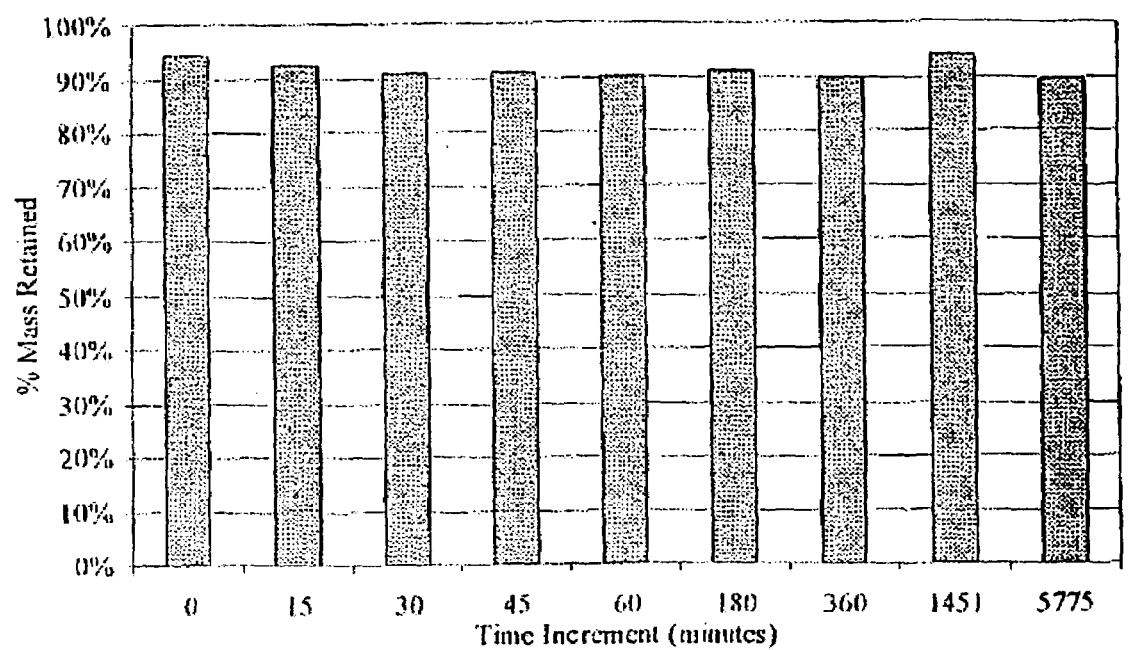
FIG. 4 shows data of the average mass retained for pre-rinsed akaganeite-coated zeolites over time.

Based on FIG. 4, the pre-rinsed, akaganeite coated zeolites lost 5% of the total mass at time zero of the test, then remained relatively constant at around 90% of the total solids retained over the extend periods of time. The soluble ions, consisting of iron lost because of the akaganeite coating, dissolved quickly into the DI water. However, after the initial loss, the mass of the akaganeite-coated zeolites remained constant. The supernatant was clear, so no visible signs of iron were noticed.

Figure 5:
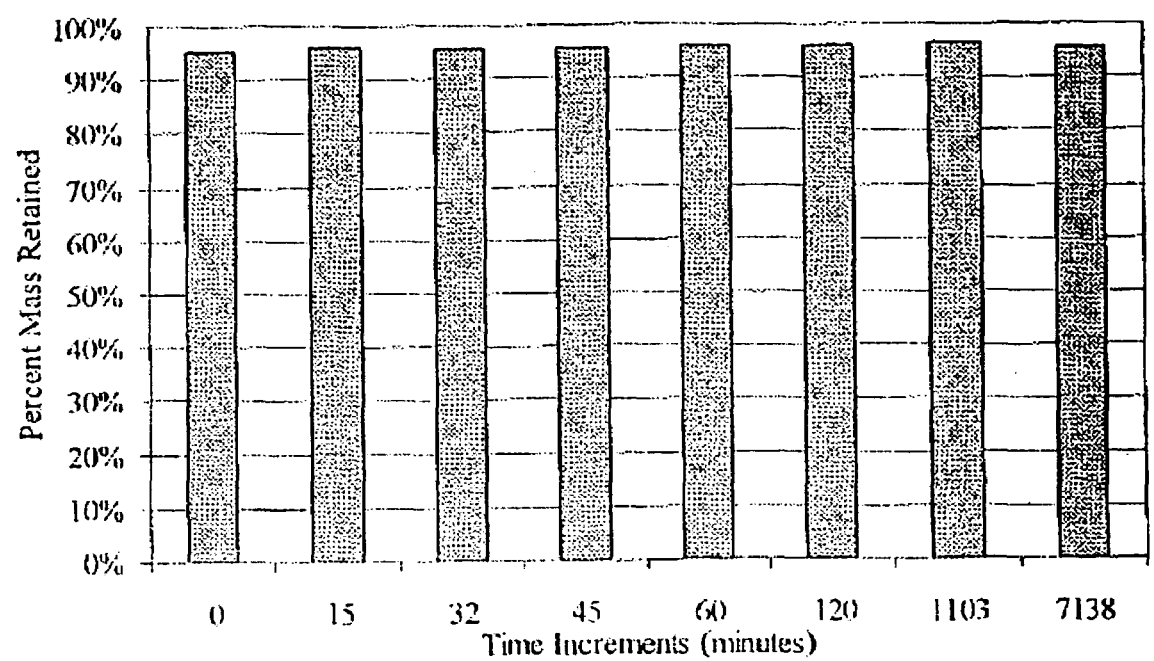
FIG. 5 shows data of the solid mass retained for rinsed akaganeite-coated zeolites over time.

The coated zeolites were rinsed in a steady stream of DI water to flush out the remaining soluble ions in the coated zeolite matrix and to increase the stability of the solid medium. Consequently, the third and final mass degradation test was used to evaluate the average mass retained for the rinsed akaganeite coated zeolites when added to DI water and mechanically rotated over a series of time increments. As in the previous mass degradation tests, the test tubes were centrifuged and the supernatant was drawn down. The akaganeite-coated medium was then oven dried, and final measurements were recorded. The average mass retained was consistently 96% over the time range of 0 to 7,138 minutes. The results for the mass degradation test on the rinsed akaganeite-coated Tilden zeolites are shown in FIG. 5.

Samples of the supernatant at time zero, 60 minutes, and 7,138 minutes of this final degradation test were analyzed for the total iron concentration. The iron content of all liquid samples tested was undetectable by methods of colorimetric spectrophotometery, so it was concluded that a negligible amount of iron was lost by rinsing the akaganeite-coated zeolite. The 4% loss in mass is most likely a result of the dissolution or abrasion of other impurities on the zeolite, including carbonates and calcium.

D. Arsenate Removal Using Coated Media

1. Near Neutral pH

A series of one-hour batch tests were conducted using the rinsed portion of the akaganeite-coated media. An arsenate solution with an initial concentration of between 400 and 500 ppb was used at a neutral pH for the first set of batch tests. A measured mass of the coated zeolite was added to each tube, and the akaganeite dosage was then determined by the mass ratio of akaganeite to zeolite, reported in an earlier section. The measured mass of coated zeolite was added to the neutralized arsenic solution made with nanopure or DI water. The final pH, initial and final arsenic concentrations, akaganeite dosage, and x/m are shown in Table 9.

TABLE 9

Results for Neutral pH Tests Using Akaganeite-Coated Zeolite

| Final pH | Initial As Conc., ppb | Final As Conc., ppb | Removal Efficiency | Does of Akaganeite, mg/L | x/m, mg As/g AK |
| --- | --- | --- | --- | --- | --- |
| 7.44 | 405 | 270 | 33% | 24.2 | 5.6 |
| 7.13 | 405 | 200 | 51% | 24.1 | 8.5 |
| 6.99 | 513 | 301 | 41% | 48.1 | 4.4 |
| 6.95 | 513 | 286 | 44% | 48.4 | 4.7 |
| 6.75 | 513 | 250 | 51% | 72.2 | 3.6 |
| 6.68 | 513 | 164 | 68% | 72.0 | 4.8 |
| 6.68 | 513 | 229 | 55% | 72.2 | 3.9 |
| 6.70 | 405 | 160 | 60% | 96.1 | 2.5 |
| 6.81 | 405 | 90 | 78% | 96.0 | 3.3 |
| 6.79 | 405 | 195 | 52% | 96.2 | 2.2 |

Figure 6:
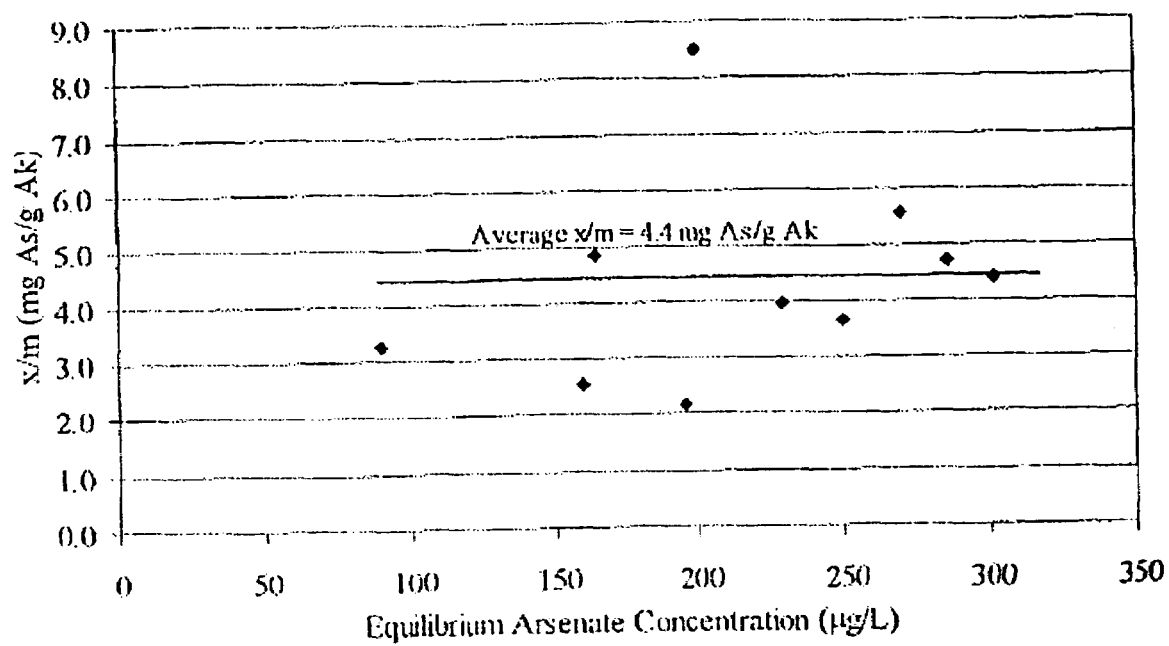
FIG. 6 shows an isotherm plot of data for akaganeite-coated zeolite at neutral pH.

The x/m ratio greatly decreased compared to the batch tests conducted at a neutral pH with akaganeite in an aqueous suspension. The trend of x/m versus the equilibrium concentration of arsenate is given in FIG. 6.

The equilibrium plot for the akaganeite-coated zeolites with neutral pH arsenic water displayed a somewhat constant value trend at an average x/m of 4.8 mg arsenate per gram of akaganeite. This trend may indicate that this is the horizontal portion of a Langmuir isotherm. A Langmuir isotherm increases steadily from zero and flattens out as the removal medium reaches saturation. It appears that the akaganeite-coated zeolites had a fixed number of sites available for adsorption, and at the equilibrium concentration range tested, the isotherm plot reached the saturation point.

2. Near pH of 6.0

A second set of one-hour batch tests using the rinsed akaganeite-coated zeolite was conducted at a pH closer to the optimum pH value of 5.1 found in the earlier experiments. However, the test was done with DI water, and without the buffering capacity. The final pH was measured at approximately 6.0. A lower initial concentration of around 200 ppb arsenic was utilized for these tests. The final pH, initial and final arsenic concentrations, akaganeite dosage, and x/m are given in Table 10.

TABLE 10

Results for pH 6 Tests of Akaganeite-Coated Zeolite

| Final pH | Initial As Conc., ppb | Final As Conc., ppb | Removal Efficiency | Dose of Akaganeite, mg/L | x/m, mg As/g Ak |
|---|---|---|---|---|---|
| 6.53 | 226 | 132 | 42% | 24.1 | 3.9 |
| 6.41 | 226 | 132 | 42% | 24.0 | 3.9 |
| 6.40 | 226 | 130 | 42% | 24.0 | 4.0 |
| 6.05 | 226 | 46 | 80% | 48.0 | 3.7 |
| 6.17 | 226 | 58 | 74% | 48.0 | 3.5 |
| 6.11 | 226 | 64 | 72% | 48.0 | 3.4 |
| 6.00 | 188 | 36 | 81% | 48.2 | 3.2 |
| 6.00 | 188 | 60 | 68% | 48.0 | 2.7 |
| 6.03 | 188 | 44 | 77% | 48.0 | 3.0 |
| 5.94 | 188 | 8 | 96% | 72.1 | 2.5 |
| 6.00 | 188 | 0 | 100% | 72.1 | — |
| 5.96 | 188 | 0 | 100% | 72.0 | — |

Figure 7:
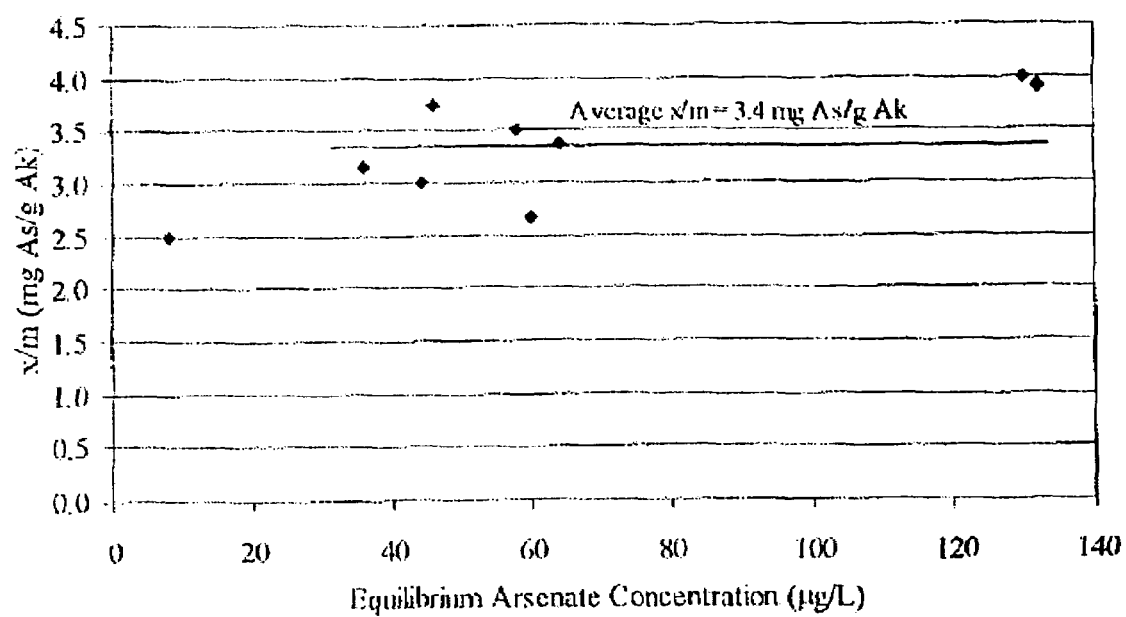
FIG. 7 shows an isotherm plot of akaganeite-coated zeolite at a pH of approximately 6.

The equilibrium arsenate concentration versus x/m was also plotted at this lower pH range. The graph is shown in FIG. 7. The graph indicates a better representation of a Langmuir isotherm. An increase is seen in the lower range of equilibrium concentrations from 5 to 60 ppb, then the concentrations level off.

Figure 8:
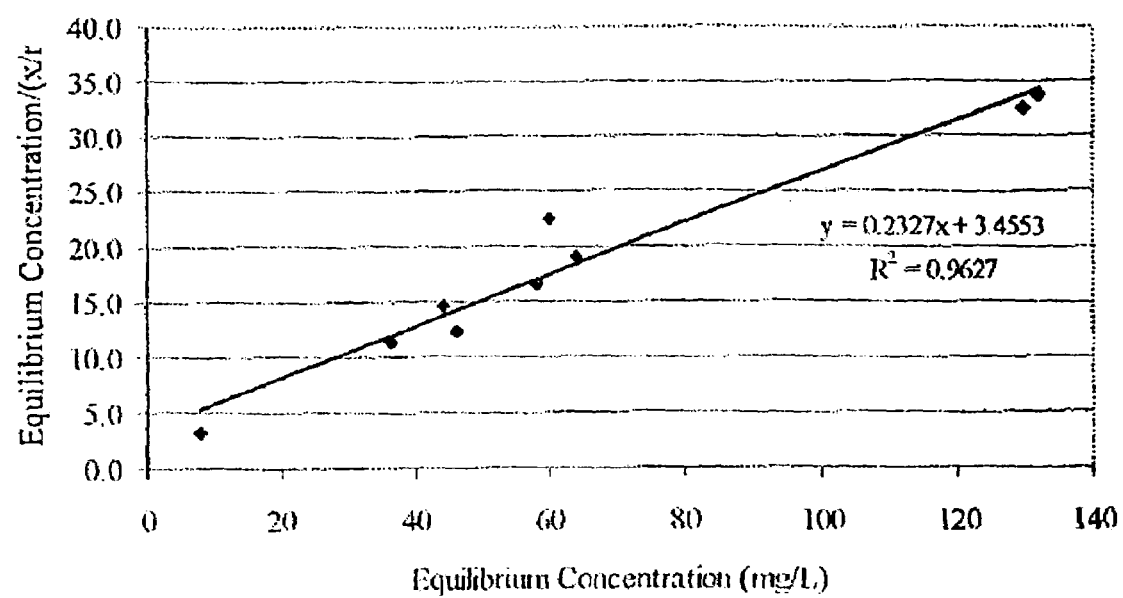
FIG. 8 shows a Langmuir isotherm at a pH of approximately 6.

In order to solve for the empirical constants, "a" and "b", in the Langmuir isotherm, the plot must be modified to fit a linear equation. The resulting plot is the equilibrium concentrations over x/m versus the equilibrium concentration. The resulting plot and isotherm equation is provided in FIG. 8. The constant at pH near 6 for "a" was 4.3 for rinsed akaganeite-coated zeolite and for "b" was 0.067.

3. Tap Water

The final set of one-hour batch tests using the akaganeite-coated media was completed with tap water from a source in the New Mexico State University campus. The initial arsenate concentration was altered to around 200 ppb. Tests performed with the tap water were done at the natural pH, which is slightly alkaline. The final pH, initial and final arsenic concentrations, akaganeite dosage, and x/m are given in Table 11.

TABLE 11

Results of Tap Water Tests Using Akaganeite-Coated Zeolite

| Final pH | Initial As Conc., ppb | Final As Conc., ppb | Removal Efficiency | Dose of Akaganeite, mg/L | x/m, mg As/g Ak |
|---|---|---|---|---|---|
| 7.34 | 168 | 108 | 35% | 24.1 | 2.5 |
| 7.33 | 168 | 126 | 25% | 24.0 | 1.8 |
| 7.31 | 168 | 112 | 33% | 24.0 | 2.3 |
| 7.28 | 168 | 72 | 57% | 48.0 | 2.0 |
| 7.29 | 168 | 72 | 57% | 48.0 | 2.0 |
| 7.28 | 168 | 82 | 51% | 48.0 | 1.8 |
| 7.32 | 188 | 70 | 63% | 48.2 | 2.5 |
| 7.32 | 188 | 58 | 69% | 48.0 | 2.7 |
| 7.30 | 188 | 50 | 73% | 48.0 | 2.9 |
| 7.29 | 188 | 38 | 80% | 72.0 | 2.1 |
| 7.27 | 188 | 33 | 83% | 72.1 | 2.2 |
| 7.30 | 188 | 51 | 73% | 72.1 | 1.9 |

Figure 9:
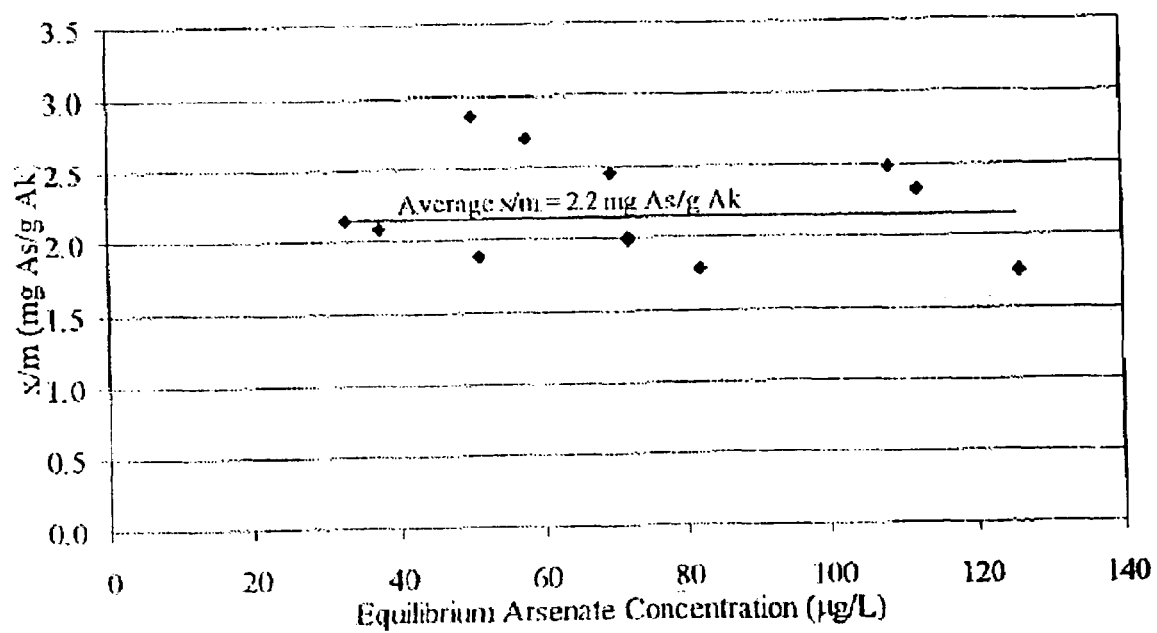
FIG. 9 shows an isotherm plot for akaganeite-coated zeolite in tap water.

Also plotted were the equilibrium arsenate concentration versus the x/m of the tap water data. The graph is shown in FIG. 9.

The equilibrium plot for the tap water shows a somewhat constant value trend at an average x/m of 2.2 mg arsenate per gram of akaganeite. This trend may also indicate that this is the horizontal portion of a Langmuir isotherm. As in the two earlier tests using this media, it appears that the akaganeite-coated zeolites have a limited capacity, and at the equilibrium concentration range tested, the isotherm plot reaches the saturation point.

IV. Summary of Test Utilizing Zeolites Carrier Media

Rinsed akaganeite-coated zeolite was used to treat arsenic contaminated water at neutral pH, pH of 6, and tap water from a groundwater source. The average x/m was determined for each of the testing conditions. Table 12 shows the average x/m ratio and parameters for the different sets of batch tests using the rinsed akaganeite-coated zeolite.

TABLE 12

Average x/m Ratio for Three Coated Zeolite Tests

| Type of Arsenic Solution | Average Initial As Concentration, ppb | Average x/m, mg As/g AK |
|---|---|---|
| DI water Near Neutral pH | 459 | 4.4 |
| DI water pH ≈ 6 | 207 | 3.4 |
| Tap water pH ≈ 7.3 | 178 | 2.2 |

When comparing the x/m ratios of the two tests done with DI water, the value seems to decrease. However, if the x/m ratio is weighted because of the increased initial concentration of the neutral tests compared to the tests conducted at pH 6, the values are similar. This indicates that pH has a much lesser effect on dried akaganeite as it does on akaganeite in suspension. Also shown in Table 12 is a comparison of the average x/m of the treatment of tap water and of the neutralized solution using DI water. The reduction by half could be the result of competition by other ions in the natural water, such as nitrate or sulfate.

V. Comparison of Treatment Methods Utilizing Zeolite Carrier Media

The akaganeite was used in different phases throughout the experiments, originally in a concentrated akaganeite suspension, then as a dried and powdered concentrated akaganeite, then finally as attached to a zeolite carrier medium. Using optimal conditions based on the maximum x/m, Table 13 provides a comparison of each phase of the batch tests.

TABLE 13

Parameters for the Maximum x/m for Three Phases of Batch Tests

| Phase of Akaganeite Treatment | Final pH | Dosage of Akaganeite, mg/L | Initial As Concentration, ppb | Average As Removal | Average x/m, mg As/g Ak |
|---|---|---|---|---|---|
| In Suspension | 4.9 | 4.0 | 4.73 | 98% | 118 |
| Dried @ 50° C. | 6.9 | 20 | 322 | 85% | 13.7 |
| Coated on Zeolite | 7.1 | 24 | 405 | 51% | 8.5 |

As seen by the decreasing value of the x/m, akaganeite must not be dried to ensure the optimum removal of arsenic in water. The x/m at optimal conditions for the akaganeite in suspensions is nearly nine times greater than the value using dried akaganeite. Although the akaganeite dried at ambient conditions removed 100% of the arsenic in the solution, the x/m ratio could not be calculated because the equilibrium concentration was zero. The results of the media tests also show a lowered x/m because the akaganeite-coated zeolite was dried at ambient conditions.

Tests Utilizing Cotton, Limestone, and Seashells

I. Chemicals and Media Preparation

A. Akaganeite Suspension

A 55-gallon (approximately 208 liter) blue high-density plastic container from the Grief Bros. Industrial Shipping Corporation was utilized to make a large volume of akaganeite suspension. As instructed by Schwertmann and Cornell (1991), an initial 0.1 M iron solution was made by dissolving Fisher brand lump ferric chloride, ($FeCl_3.6H_2O$) in nanopure water at a concentration of 26.9 g/L. The barrel was incubated at 40° C. for approximately 1 month, after which it was stored at 35° C. During the 40° C. incubation, a yellowish orange precipitate was formed, and the pH of the suspension dropped to approximately 1.5. Somatoid, or cigar shaped, crystals were formed. The crystals were approximately 30 nm to 1 um in length as a result of frequently twinned crystals (Schwertmann and Cornell, 1991). The solids were pumped from the bottom of the drum using a PVC pipe extension on a peristaltic pump. Using a set of 3 settling cones, the solids were concentrated, and the supernatant was pumped off the top and returned to the original 55-gallon container. The aqueous suspension of concentrated akaganeite solids was used in the various sets of batch tests.

B. Arsenate Solution

An arsenate solution was prepared using a SPEX brand plasma grade standard of 1000 mg/L or ppm arsenic. The standard was made with ultra pure arsenic metal dissolved in nanopure water and stored with 5% nitric acid. The standard was understood to be in the +5 oxidation state because the solution was in contact with atmospheric oxygen. A 1 L stock arsenate solution of 20 ppm was made by diluting 20 mL of the 1000 ppm standard in nanopure water. The 20 ppm stock arsenate solution was acidified with 0.1 N $HNO_3$ and was used in various dilutions for the series of batch tests. This stock was used in various dilutions for the batch tests performed on the calcium carbonate chips and sea shell media.

The second stock solution was prepared dissolving Fischer brand sodium arsenate ($Na_2HAsO_4.7H_2O$) in sufficient nanopure water to produce a 20 mg/L or ppm Arsenate solution. The stock solution was taken to a neutral pH and stored as such. This stock was used in various dilutions for the batch tests performed using cotton media.

The third stock solution was also prepared using Fischer brand sodium arsenate, but in larger volumes to provide a sufficient supply for filtration runs. Ten liters of 100 ppm or mg/L arsenate solution was produced at a time by dissolution of 4.160 g sodium arsenate in ten liters of de-ionized (DI) water. This stock was used as the arsenic supply for the column tests, and more was produced as the feed supply ran low.

C. Iron Standards

Iron standards were prepared using SPEX brand 1000 μg/mL Iron in 2% $HNO_3$. The standards were prepared to calibrate data gathered in spectrophotometery on samples containing dissolved iron.

D. Limestone

Limestone chips were prepared by crushing waste concrete in a rock crusher. The chips produced were sieved, and the masses retained as separate batches for akaganeite coating were those between U.S. standard sieves number 10, 20, 30, and 40. These limestone chips were later identified to have only 20-25% acid-soluble solids. The chips were rinsed with nanopure water for approximately 5 minutes using a fine colander. They were then dried in an oven set at 100° C. for 48 hours. After cooling in a desiccator, the chips were exposed to akaganeite and subsequently rinsed and dried by a variety of methods. All rinsing was performed using DI water and a shallow tray, rinsing until the yellowish tint was no longer noticeable in the rinse effluent and for about 5 additional minutes thereafter. Average akaganeite mass concentrations varied from 1.2% to 1.7% by weight.

E. Sea Shells

Sea shell chips were prepared by crushing generic sea shells using a pestle and mortar. The chips which were subsequently sieved and the mass retained between U.S. standard sieves no. 10 and no. 20 was removed and rinsed with DI water for approximately 5 minutes using a fine colander and shallow tray. The chips were then incubated at 35° C. for approximately 2 weeks. They were then exposed to akaganeite by placing them in a plastic jar with approximately 1 part stock akaganeite solution per 3 parts DI water and rotated in a rotating machine designed for use with a TCLP test for 48 hours. There was a noticeable decrease in the average size of the chips after they were removed from the akaganeite suspension. Next, rinsing was performed using DI water and a shallow tray until the yellowish tint was no longer noticeable in the rinse effluent and for about 5 additional minutes thereafter. The chips were then placed in an open container, loosely covered with plastic wrap, and incubated at 35° C. for drying and storage.

F. Cotton

Two potential cotton media were utilized—sanitary cotton balls, and Roc-Lon® unbleached muslin fabric #403 cut into approximately one-half inch by inch strips. Both media were placed in containers with DI water and the akaganeite stock suspension, at an approximately 5 to 1 ratio, respectively. The containers were then rotated in the TCLP apparatus for 48 hours.

The cotton balls were immediately rinsed using a shallow tray until a yellowish tint was no longer visible in the effluent, and for about 5 more minutes thereafter. Half of the muslin strips were also immediately rinsed following the same process. Both of these batches were then placed in open containers loosely covered with plastic wrap and incubated at 35° C. for drying and storage. The remaining half of the muslin strips were not immediately rinsed but were immediately removed from the akaganeite suspension and placed in a container loosely covered with plastic wrap in the 35° C. incubation room. After having visibly dried, the strips were rinsed following the standard rinsing procedure.

Three more batches of cotton were prepared for use in equilibrium and kinetics tests. These three batches were prepared by placing muslin strips in containers with DI water and akaganeite stock suspension, at approximately a 5 to 1 ratio, respectively, followed by rotation in the TCLP apparatus for 48 hours. This exposure was immediately followed by rinsing by the standard rinse procedure and placement in a container loosely covered with plastic wrap and incubated at 35° C. for drying and storage. A portion of the first batch was not dried following rinsing. Instead, it was kept sealed and fully immersed in nanopure water to examine the effects of drying on akaganeite removal of arsenic from aqueous solutions.

A cotton medium was selected to perform filter column tests. One-half-micron string-wound bleached cotton filters with a plastic core were obtained from Eggelhof, Inc. The dimensions of these materials were OD=2.5 in, ID=1.25 in, and height=9.7 in. These filters were placed in a small plastic tub with stock akaganeite suspension and sufficient nanopure water to allow for total immersion. The filters were turned daily in suspension for 2 weeks and then given three rough rinses with nanopure water and placed completely in fresh nanopure water after each rinsing.

II. Experimental Protocols

A. Column Tests

Filters were prepared for column tests by tightly applying packing tape around a section to be cut and then cutting through the filter using a knife. Marine Goop brand glue was then applied to the cut end and allowed to set for 10 minutes before removing the tape and loading the filter into the column. Approximately 10 liters of tap water was then run through the filter prior to the beginning of a filtration run so as to remove any remaining unbound particulate akaganeite.

B. Measurement of Arsenic Concentration

The arsenic concentrations of all samples were determined using a Perkin-Elmer brand 5000 Atomic Absorption (AA) Spectrophotometer connected with a graphite tube furnace with a Perkin-Elmer HGA 500 programmer and a Perkin-Elmer AS-40 autosampler. The AA was programmed for a wavelength of between 195 and 197 nm and an 18 mA lamp power with a 6.0 second read time. The autosampler introduced 20 µL of sample and 20 µL of a 1 g/L nickel as $Ni(NO_3)_2$ in 1% nitric acid to the graphite tube furnace per analysis event. The furnace was programmed with the steps shown in Table 14. A baseline of −7 and read-and-record instructions were assigned to step 3.

TABLE 14

Furnace Settings for the HGA 500 Programmer

| Step | Temp (° C.) | Ramp Time (s) | Hold Time (s) | Gas flow |
|---|---|---|---|---|
| 1 | 350 | 30 | 10 | 300 |
| 2 | 1300 | 10 | 10 | 300 |
| 3 | 2300 | 0 | 6 | 0 |
| 4 | 2700 | 2 | 3 | 300 |

C. pH

Research involving the affect of pH on arsenic removal generally required the modification of a diluted arsenate solution. Initial pH levels were raised using 1 N sodium hydroxide and lowered using 1 N nitric acid. The preparation of a diluted arsenic solution required the combination of stock arsenate solution and nanopure water in appropriate ratios, with mixing achieved with a magnetic stirring device. The same magnetic stirrer was used to mix prepared waters after pH modification events, but the samples were always removed from the stirring device after mixing to be measured with an Orion Model 410 SureFlow electrode pH meter. Final pH levels for equilibrium tests were taken subsequent to the removal of a portion of the given test tube for use in AA analysis.

D. Iron Determinations

Measured masses of akaganeite-coated media were placed in glass tubes with measured quantities of undiluted hydrochloric acid, ranging from 10 to 30 milliliters. The tubes were allowed to sit for approximately two weeks before diluting a portion of the solution with approximately 0.1 M potassium thiocyanate and measuring the absorbance of the Fe/NCS⁻ complex at a wavelength of 478 nm in a Hewlett Packard brand 8452A Diode Array Spectrophotometer.

The measured absorbance was correlated with iron concentration by using iron standards of known iron concentration and measured absorbance in a linear model. Knowing the iron concentration and liquid volume, the mass of iron present on the initial coated media could then be determined and subsequently the mass percentage of total combined media and akaganeite mass existing as iron. The mass of akaganeite can be calculated using the ratio of the molecular weight of akaganeite to iron because of the 1:1 stoichiometry. The ratio of akaganeite mass to uncoated media mass can then be determined mathematically from the ratio of akaganeite mass to media mass plus akaganeite mass.

E. Arsenate Removal Tests

Arsenate removal tests began with the dilution of a portion of the 20 ppm arsenate stock to a selected concentration using nanopure water and mechanical mixing followed by pH modification to a selected initial level, typically 800 ppb or µg/L. The solution was then poured into a selected number of labeled 50 mL plastic tubes. Selected measured masses of akaganeite-coated media were then added to the tubes, adding no media to some tubes to serve as "zeroes" or "blanks." The tubes were subjected to a selected exposure time while being mechanically rotated.

After the prescribed time had elapsed, tubes were removed, samples taken from each one and placed in sample bottles. A measured volume of dilution water was also added to the sample bottles if it was deemed necessary to bring the concentration below the typical maximum standard of 200 ppb or µg/L arsenic used in AA analysis. The samples were also acidified using 0.1 N $HNO_3$. The final pH levels of the solutions in the 50 mL tubes were measured and recorded after Two different tests were undertaken to explore the effect of drying akaganeite. The first entailed filling a set of 50 mL tubes with 25 mL of nanopure water each. Half of these tubes were designated to be for "potentially re-hydrolyzed" akaganeite-coated media and were also loaded with measured masses of a selected media at that time and then sealed. The other half was designated for dry media and did not have any mass added at this point, but were sealed to prevent evaporation or the introduction of airborne variables. After one week, an arsenate solution of a concentration twice the typical initial batch concentration was prepared and 25 mL was added to each tube. Measured dry media masses equivalent to the "potentially re-hydrolyzed" media masses were also then added to the appropriate tubes. The batch test then proceeded normally with an exposure time of 1 hour. The media used for this test were an akaganeite-coated zeolite and akaganeite-coated limestone chips.

The second test was undertaken for the cotton media. A small portion of one prepared batch of muslin fabric strips was not drained and left to dry in an incubated room, but was instead submersed fully in nanopure water and tightly covered and stored at 35° C. Approximately one week later, upon drying, a typical arsenate removal test was performed on the strips that were left to dry for a six hour arsenic exposure time using both the dry and wet portions of the same batch, excepting that the media mass of the wet strips could not be measured at the time of tube-loading. Instead, after samples were removed and pH levels taken, the tubes were drained and left loosely covered to dry in the incubated room. Once all of the masses appeared to be dry, they were then measured and recorded to be used for calculations in the tests.

This test was repeated later with a specially prepared batch using tap water in the dilution of the arsenate solution and only examining a 24 hour exposure time.

Tests to describe the kinetics of akaganeite-coated muslin were undertaken using a batch process approach with exposure time being varied between batches. The effect of pH on kinetics was also considered and used in a variable in batch tests. Simultaneously, isotherm tests entailing the varying of mass of adsorbent while holding arsenic exposure concentration constant were undertaken. The effect of pH on isotherms was also considered and used as a variable. Conducting these two tests simultaneously, the variables were originally identified to be pH, mass, and time.

It was discovered that pH had a potentially strong impact on the arsenate removal mechanism for cotton-bonded akaganeite and that the akaganeite-media had a strong impact on pH of the arsenate solutions made using unbuffered nanopure water. Because of these factors, the identification of variables was refined to clarify that the pH of importance for kinetics was the initial pH prior to media exposure as the pH-lowering effect of the media was part of the kinetics, and the pH of importance for isotherms was the final pH taken after exposure, taken to be the equilibrium pH.

The initial arsenic concentration of a batch test was determined by using the AA analysis of the set of "zeros," where no media was loaded into the tubes. The final arsenic level, $C_e$, was determined by AA analysis of samples taken after completion of a batch test. The difference between the initial and final levels is then the amount of arsenic removed, designated x. The mass of akaganeite present in a batch test is determined using iron analysis results for the medium used in the batch test and the measured mass of that medium and is designated m. The x/m ratio, also designated X, is then of interest as the unit mass of arsenic removed per unit mass of akaganeite added.

F. Adsorpotion Isotherm

A Langmuir Isotherm was used to model the relationship between the final arsenic concentration, taken to be the equilibrium concentration, and the x/m ratio. Because the isotherm inherently implies that an equilibrium concentration has been reached, time cannot be incorporated into the model. Also, the effect of pH on adsorption with akaganeite-coated cotton generally means that the model only fits for data with an equilibrium pH at or below approximately 5.5. No model was found to describe adsorption at higher pH.

G. Exposure Times

In addition to varying akaganeite dose and pH, several different exposure times were used in batch tests to determine any relationship between contact time and the adsorption mechanic. To express the results of these tests, removal efficiency was calculated by dividing the concentration of arsenic removed by the initial concentration.

H. Tap Water Tests

Tap water batch tests were conducted to examine the effect of competition by other compounds present in tap water for sites on the akaganeite-coated cotton media and thus for the impact of using the technology in a more realistic setting than a water containing only arsenate. Table 15 lists various water quality parameters of the water used for the tests.

TABLE 15

Water Quality Parameters of Tap Water Used in Batch Tests

| Element | Method | Result | Units | Maximum Detection Level (MDL) |
| --- | --- | --- | --- | --- |
| Sodium by ICP- | 200.7 | 53.11 | mg/L | 0.1 |
| Potassium by ICP- | 200.7 | 5.1 | mg/L | 0.1 |
| Calcium by ICP- | 200.7 | 71.54 | mg/L | 0.1 |
| Magnesium by ICP- | 200.7 | 10.53 | mg/L | 0.1 |
| Calcium (for SAR)- | 200.7 | 3.57 | meq/L | 0.01 |
| Magnesium (for SAR)- | 200.7 | 0.87 | meq/L | 0.01 |
| Hardness as $CaCO^{3-}$ | 130.2 | 222 | mg/L | 1 |
| Alkalinity as $CaCO^{3-}$ | 2320B | 149.0 | mg/L | 0.1 |
| Carbonate alkalinity | 310.1 | 0.0 | mg/L | 1.0 |
| Bicarbonate alkalinity | 310.1 | 181.8 | mg/L | 1.0 |
| Chloride by Autoanalyzer | 4500-Cl_D | 62.9 | mg/L | 0.5 |
| Sulfate | 4500-SO4_E | 73 | mg/L | 10 |
| Total Dissolved Solids | 160.2 | 392 | mg/L | 1 |

Samples of this tap water were also taken periodically for arsenic analysis by AA and never provided a result that could be detected.

Batch tests performed using tap water were prepared identically to those for DI water except that tap water was used in the dilution of the arsenate solution. No pH modifications were done on tap water batches and all sample runs were performed for 24 hours.

Comparative tests were done where tube pairs were prepared using arsenic concentrations, media masses, and exposure times typical for the batch tests. However, while one of the tubes was prepared normally, the second tube was prepared by minimizing or eliminating the contact between the solution and atmosphere. This was achieved by performing mixing in the tube as opposed to in a separate vessel by loading the tube with the media mass and a volume of 20 mg/L arsenate followed by introduction of tap water to the bottom of the tube using a faucet-attached hose and filling to the maximum volume so as to avoid the entrapment of any atmospheric air in a headspace once sealed. The pH levels of the tube pairs were then measured and compared after a selected exposure time had passed.

A column test was conducted using tap water spiked with a known concentration of arsenate. The tap water was allowed to move freely through the system and the feed rate of the arsenic was adjusted at the peristaltic pump to provide a ratio of tap water to 100 ppm arsenate which would result in a theoretical mixed stream concentration of 50 ppb arsenate. An initial column run was prepared to test the system and operational parameters such as flow rate. Two subsequent runs were then started to attempt to gather breakthrough data but were terminated early due to minor system problems. A fourth column test ran successfully for just over 1 week until the test was terminated.

Effluent sampling was scheduled for every 8 hours and consisted of collecting a volume of effluent in a glass beaker and transferring a portion of it to plastic sample bottles with a small quantity of 15% $HNO_3$ for acidification. Filter influent sampling was done less frequently, at a time at least 2 hours prior to a scheduled effluent sampling event and was accomplished by removing the influent pipe from the filter and allowing approximately 2 minutes of flow for stabilization before collecting a sample and acidifying it in the same fashion as for an effluent sample. Influent and effluent samples were tested for total arsenic concentration by AA analysis.

Using the data obtained from the samples, a partial breakthrough curve was developed for the fourth column test. Data obtained from this curve can then be modeled by the kinetic approach. The expression for an adsorption column is $$\frac{C}{C_0} \cong \frac{1}{1 + e^{\frac{k_1}{Q}(q_0 M - C_0 V)}}$$

This form can be linearized as $$\ln\left(\frac{C_0}{C} - 1\right) = \frac{k_1 q_0 M}{Q} - \frac{k_1 C_0 V}{Q}$$

with $q_0$ representing the maximum solid-phase concentration of the adsorbed solute (Hanson et al., 1998).

III. Results

A. Akaganeite Characterization

Akaganeite adsorption onto the media tested was quantified by exposing a known mass of the coated media to concentrated hydrochloric acid for a minimum of one week. The hydrochloric acid solution was then analyzed for total iron by spectrophotometery. It is assumed that all of the iron mass on the media exists as akaganeite, so the mass of akaganeite is then related to the mass of iron based on the ratio of the molecular masses due to the 1:1 stoichiometry, which is 88.86 grams of akaganeite per 55.8 grams of iron. The percent of the total mass of a coated medium accounted for by akaganeite can then be determined by dividing the calculated akaganeite mass by the total mass. The ratio of the mass of akaganeite to mass of uncoated media can be determined by first subtracting the mass of akaganeite from the total coated mass and relating this result to the mass of akaganeite. Average results for the mass of akaganeite found on the various media tested are presented in Table 16.

TABLE 16

Average Akaganeite Content of Primary Coated Media

| Media Type | Average Akaganeite to Media Ratio (g/g) | Standard Deviation (g/g) |
|---|---|---|
| Concrete Chips | 0.016 | .008 |
| 20 × 40 Limestone Chips | 0.020 | 0.0014 |
| 10 × 20 Limestone Chips | 0.018 | 0.007 |
| 10 × 20 Crushed Sea Shells | 0.011 | 0.0012 |
| Muslin Fabric | 0.082 g/g | 0.018 g/g |
| Packaged Cotton Balls | 0.082 g/g | 0.034 g/g |

A single factor analysis of variance (ANOVA) was used to evaluate the different media. The F statistic given in the ANOVA table was used to test the hypothesis that there is no significant difference between the true mean akaganeite masses per coated media mass for the different media. Table 17 shows the ANOVA results for a confidence level of 95%. The results indicate that the true average akaganeite concentrations do not differ significantly from each other for the two limestone chip batches and the crushed sea shell batch or between the cotton ball and muslin fabric batches. There is, however, a significant difference between these two groups.

TABLE 17

ANOVA Results for Akaganeite Concentration on Varying Media

| Source of Variation | Sum of Squares | Degrees of Freedom | Mean Square | $F_{test}$ | $F_{critical}$ |
|---|---|---|---|---|---|
| Treatments | 0.01982 | 4 | 0.004900 | 17.46 | 2.96 |
| Error | 0.00277 | 17 | 0.000281 | | |
| Total | 0.02259 | 21 | | | |

The muslin fabric showed several attributes favorable to the cotton balls. It showed a greater ease of preparation, requiring less time and rinse water volume as the saturated cotton balls formed amorphous sticky clumps whereas the muslin fabric strips could still be easily separated.

One batch of akaganeite-exposed muslin fabric strips was rinsed prior to drying, and the other was not. Iron analysis samples were prepared to determine if there was any impact on akaganeite attachment. For the rinsed and dried strips, the average akaganeite to media ratio was 0.082 g/g (with a standard deviation of 0.018 g/g). For the strips that were dried, then rinsed and dried again, the average akaganeite to media ratio was 0.085 g/g (with a standard deviation of 0.009 g/g).

A single factor ANOVA was used to evaluate the effects of reversing the rinsing and drying steps. The F statistic given in Table 18 was used to test the hypothesis that there is no significant difference between the true mean akaganeite masses per coated media mass for the different media for a confidence level of 95%.

TABLE 18

ANOVA Results for Akaganeite Concentration on Varying Media

| Source of Variation | Sum of Squares | Degrees of Freedom | Mean Square | $F_{test}$ | $F_{critical}$ |
|---|---|---|---|---|---|
| Treatments | $1.29 \times 10^{-7}$ | 2 | $6.47 \times 10^{-8}$ | 0.000152 | 9.55 |
| Error | 0.001277 | 3 | 0.000426 | | |
| Total | 0.001277 | 5 | | | |

The F test statistic value is below the critical F value, so the hypothesis that the true average akaganeite to media ratios are the same for both media cannot be rejected. Because this process alteration did not appear to have an impact, the quicker process of rinsing immediately and then doing one drying step was selected to be used in the preparation of media for equilibrium and isotherm tests.

To prepare for the masses of media necessary for planned areas of research, 3 larger batches of muslin fabric strip media were prepared by the standard process of immersion in a suspension of diluted stock akaganeite suspension, rotation for 48 hours using a TCLP Test Apparatus and rinsing using a shallow tray until a yellowish tint was no longer visible in the effluent, and for about 5 more minutes thereafter. The samples were then placed in open containers loosely covered with plastic wrap and placed in a 35° C. incubation room for drying and storage.

B. Iron Analysis

Iron analysis was performed on these media to use in determining akaganeite dosage in additional batch tests, with results shown in Table 19. A single factor ANOVA was applied to the data with the F statistic given in Table 20 being used to test the hypothesis that there is no significant difference between the true mean akaganeite masses per coated media mass for the different batches at a confidence level of 95%.

TABLE 19

Average Akaganeite Content of Cotton Media Used in Batch Tests for the Removal Of Arsenate

| Batch Label | Average Akaganeite to Media Ratio | Standard Deviation |
| --- | --- | --- |
| 6-10-1 | 0.070 g/g | 0.002 g/g |
| 6-17-1 | 0.087 g/g | 0.003 g/g |
| 6-25-1 | 0.068 g/g | 0.004 g/g |

TABLE 20

ANOVA Results for Akaganeite Concentration on Muslin Batches

| Source of Variation | Sum of Squares | Degrees of Freedom | Mean Square | $F_{test}$ | $F_{critical}$ |
| --- | --- | --- | --- | --- | --- |
| Treatments | 0.000840 | 2 | 0.000420 | 52.47396 | 3.89 |
| Error | 0.000096 | 12 | 0.000008 | | |
| Total | 0.000937 | 14 | | | |

The F test statistic exceeds the critical F value, so the hypothesis that the true average akaganeite to media ratios are the same for all three batches is rejected. A subsequent Tukey analysis confirmed what can easily be hypothesized from looking at the data in Table 19—that the true average mean akaganeite content of Batches 6-10-1 and 6-25-1 were not significantly different from each other, but that the true average mean for Batch 6-17-1 was significantly different. The batches were prepared separately but iron analysis was done in the same run, so error there is unlikely. The average value presented in Table 19 represents five different samples and the low observed standard deviations tend to suggest that there was not one bad data point affecting the average for the entire batch. Additionally, iron analyses done on other batches of prepared cotton media-those used for initial characterization of akaganeite bonding to cotton, show average akaganeite concentrations closer to those observed for batch 6-17-1. The three batches were simply kept separate and the media used for batch tests was documented so that the akaganeite dosage could be determined based on data for that specific medium.

String-wound bleached cotton filters were placed in a small plastic tub with stock akaganeite suspension and sufficient DI water to allow for total immersion. The filters were turned daily in suspension for 2 weeks and then given three rough rinses with nanopure water and placed completely in fresh nanopure water after each rinsing. Portions of the filters were cut away using a knife, rinsed thoroughly, dried and used for iron analysis. Results from these experiments are Average Akaganeite to Media Ratio=0.088 g/g with a standard deviation of 0.003 g/g.

C. Arsenic Removal

Simple batch tests were performed to determine if the deleterious effect of drying was reversible. A set of 50 mL tubes was filled with 25 mL of DI water each. Half of these tubes were designated to be for "potentially re-hydrolyzed" akaganeite-coated media and were also loaded with measured masses of akaganeite-coated zeolite at that time and then sealed. The other half was designated to be for dry media and did not have any mass added at this point, but were sealed. After one week, an arsenate solution with a concentration twice that used in other batch tests was prepared and 25 mL was added to each tube. Measured zeolite masses equivalent to the "potentially re-hydrolyzed" media masses were also then added to the appropriate tubes. The batch test then proceeded normally with an exposure time of 1 hour. The test was also later repeated using akaganeite-coated limestone chips from Batch 2-5-1. The mass of arsenate removed per mass of media was determined for each test and data was grouped by media dosage and single factor ANOVAs performed to determine the effect of one week exposure to neutral water with results presented in Table 21.

TABLE 21

ANOVA Results on the Effect Of Attempting to "Re-Hydrolyze" Dried Akaganeite on Zeolites and Limestone Chips

| Media Type and Mass Grouping | $F_{test}$ | $F_{critical}$ | Conclusion |
| --- | --- | --- | --- |
| Zeolites, mass 100 g | 0.78 | 18.51 | Do not reject null hypothesis |
| Zeolites, mass 250 g | 17.77 | 18.51 | Do not reject null hypothesis |
| Limestone Chips, mass 100 g | 0.64 | 18.51 | Do not reject null hypothesis |
| Limestone Chips, mass 250 g | 3.13 | 18.51 | Do not reject null hypothesis |
| Limestone Chips, mass 500 g | 0.02 | 18.51 | Do not reject null hypothesis |

The impact of drying on the prepared cotton media was considered and tests were undertaken to examine how severe the effect might be. A small portion of one prepared batch of muslin fabric strips was not drained and left to dry in an incubated room, but was instead submersed fully in nanopure water and tightly covered and stored in the 35° C. incubated room. Approximately one week after the strips left to dry were assessed to be dry by visual observation, a typical arsenate removal test was performed for a six hour exposure time using both the dry and wet portions of the same batch, excepting that the media mass of the wet strips could not be measured at the time of tube-loading. Instead, after samples were removed and pH levels taken, the tubes were drained and left loosely covered to dry in the incubated room. Once all of the masses appeared to be dry, they were then measured and recorded. The results of this test are shown in Table 22.

TABLE 22

Impact of Akaganeite-Coated Cotton Media on the pH of Waters Left Exposed to the Atmosphere

| Akaganeite Type | Dosage of Akaganeite (mg/L) | Final pH Level | Initial Arsenic Level (ppb) | Final Arsenic Level (ppb) | Arsenic Removed (ppb) |
| --- | --- | --- | --- | --- | --- |
| Dry | 155 | 5.32 | 829 | 121 | 708 |
| Dry | 160 | 5.31 | 829 | 160 | 669 |
| Dry | 378 | 4.63 | 829 | ND | 809+ |

TABLE 22-continued

Impact of Akaganeite-Coated Cotton Media on the pH of Waters Left Exposed to the Atmosphere

| Akaganeite Type | Dosage of Akaganeite (mg/L) | Final pH Level | Initial Arsenic Level (ppb) | Final Arsenic Level (ppb) | Arsenic Removed (ppb) |
|---|---|---|---|---|---|
| Dry | 375 | 4.6 | 829 | ND | 809+ |
| Wet | 166 | 5.24 | 829 | ND | 809+ |
| Wet | 205 | 5.19 | 829 | ND | 809+ |
| Wet | 347 | 4.7 | 829 | ND | 809+ |
| Wet | 397 | 4.52 | 829 | ND | 809+ |

The test was repeated later with a specially prepared batch of muslin fabric media and a 24-hour exposure time and tap water for the dilution of the arsenate stock solution. However, the final arsenic results for that test were all non-detects for dry and wet akaganeite. A direct ratio of the performance of wet akaganeite to dry akaganeite on cotton media cannot be shown in the data in FIG. 30, but the data show the potential of wet akaganeite to perform better than dried akaganeite in arsenate removal as it produced a non-detect at an akaganeite concentration where dry dosages still showed residual arsenic.

Figure 10:
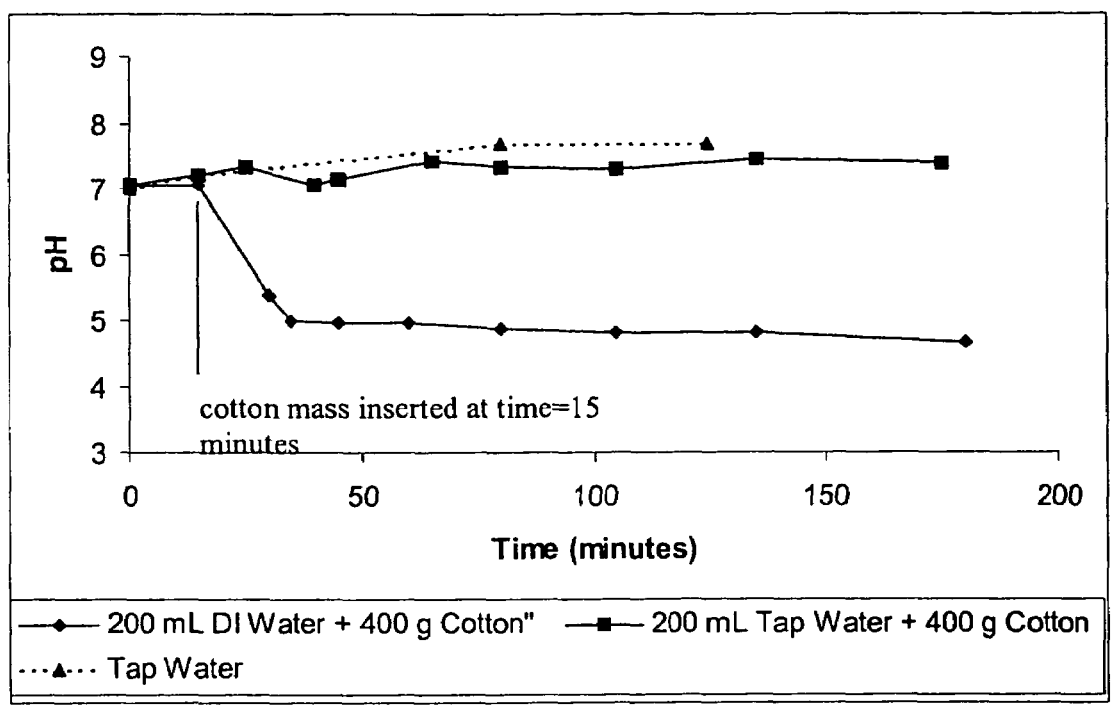
FIG. 10 shows the impact of akaganeite-coated cotton media on pH of water left exposed to the atmosphere.

Akaganeite-coated cotton was observed to have a significant impact on the pH of arsenate waters prepared with dilution with DI water. This made achieving a target final pH difficult, especially in the more neutral pH range where little or no buffer capacity existed. Obviously the effect was not so significant, even negligible, when using tap water as dilution agent due to more buffering capacity. The effect of akaganeite-coated cotton on the pH of DI and tap water left open to the atmosphere is shown in FIG. 10.

Figure 11:
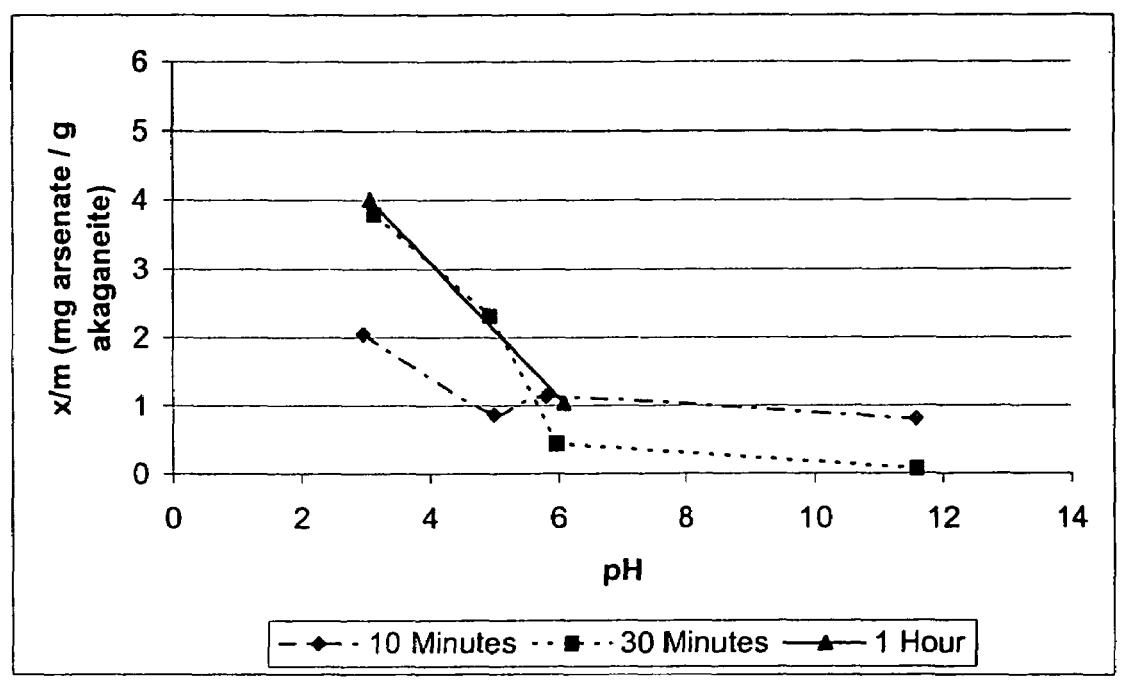
FIG. 11 shows observed x/m ratios for akaganeite doses close to 150 mg/L as akaganeite bound on muslin fabric as a function of pH and exposure time of one hour or less.
Figure 12:
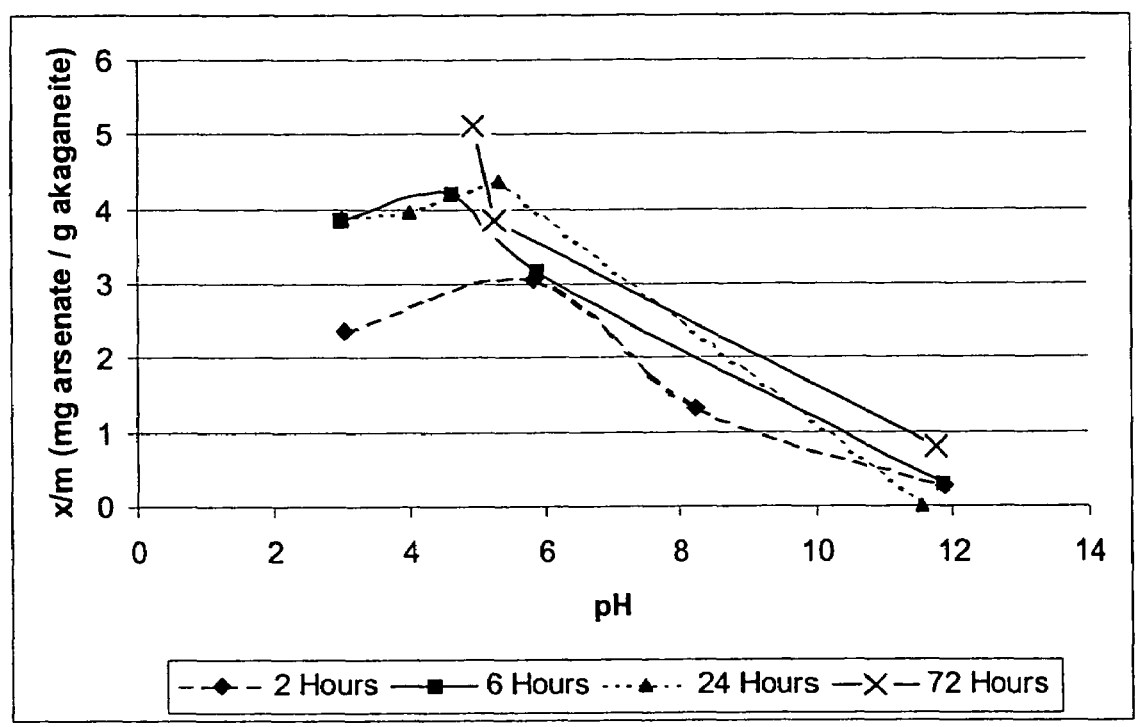
FIG. 12 shows observed x/m ratios for akaganeite doses close to 150 mg/L as akaganeite bound on muslin fabric as a function of pH and exposure time of more than one hour.
Figure 13:
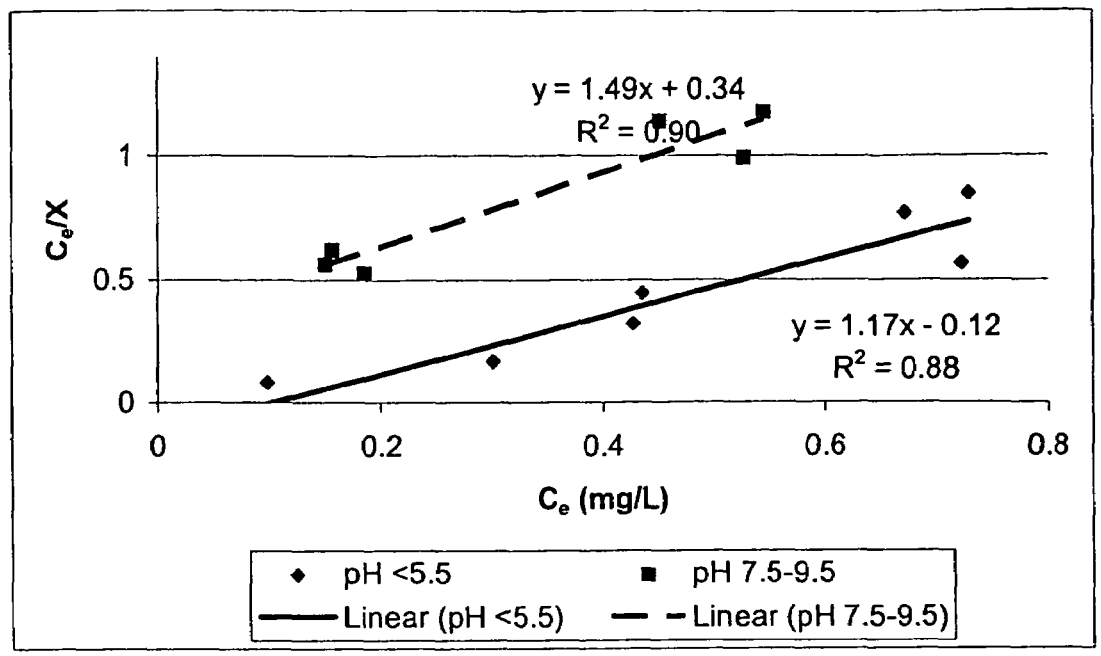
FIG. 13 shows a linearized Langmuir isotherm for 10 minute exposure time.
Figure 14:
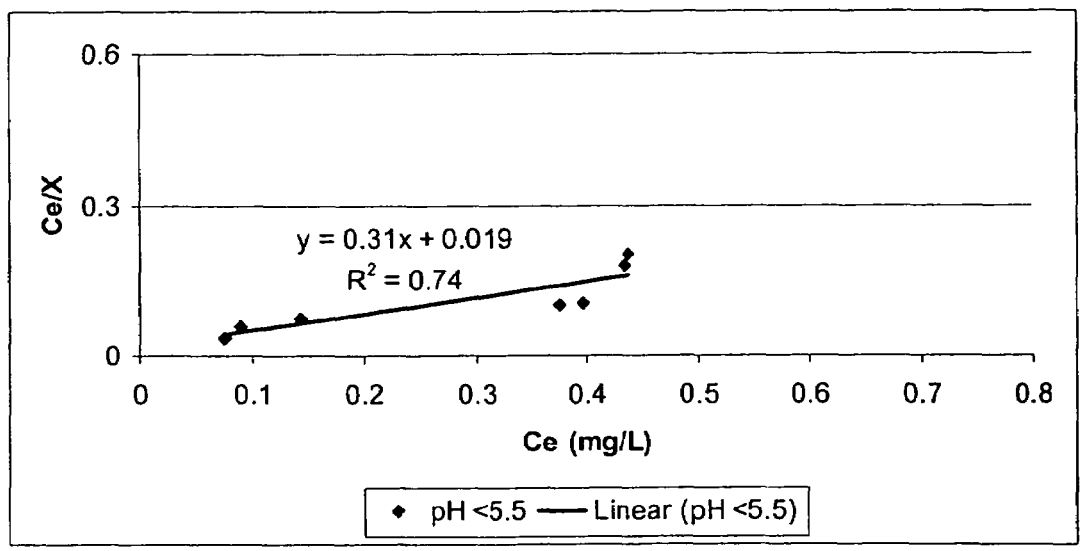
FIG. 14 shows a linearized Langmuir isotherm for 30 minute exposure time.
Figure 15:
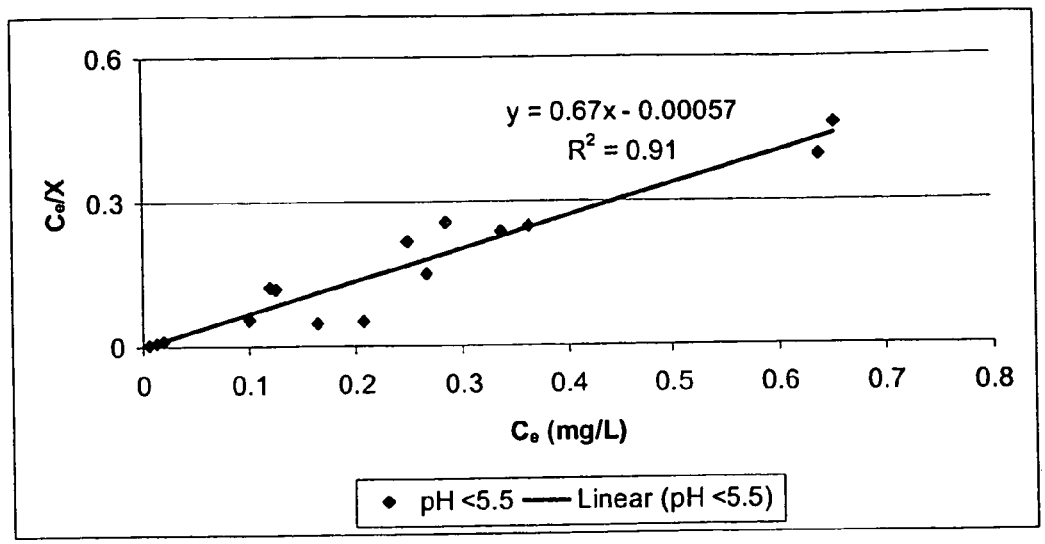
FIG. 15 shows a linearized Langmuir isotherm for 1 hour exposure time.
Figure 16:
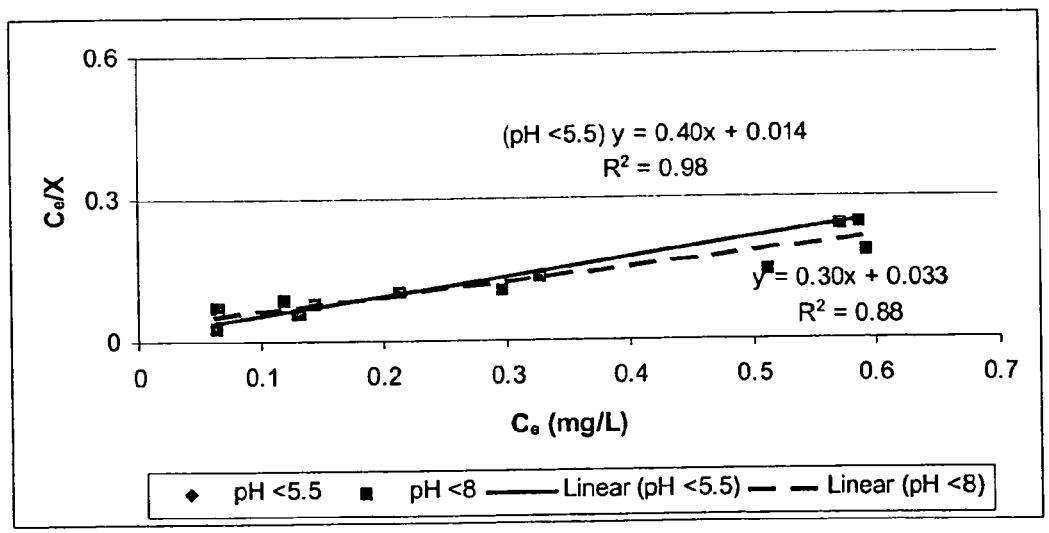
FIG. 16 shows a linearized Langmuir isotherm for 2 hour exposure time.
Figure 17:
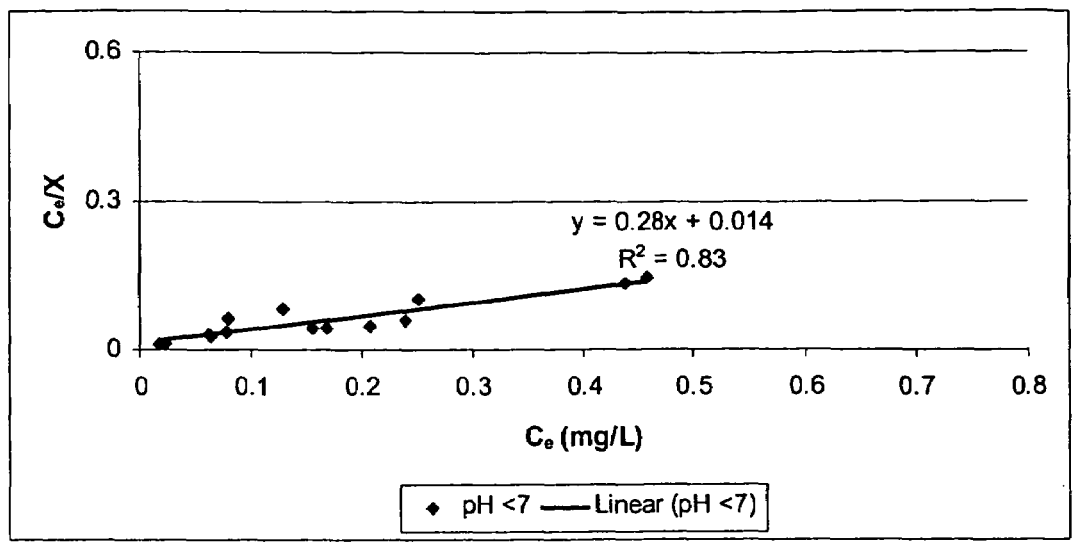
FIG. 17 shows a linearized Langmuir isotherm for 6 hour exposure time.
Figure 18:
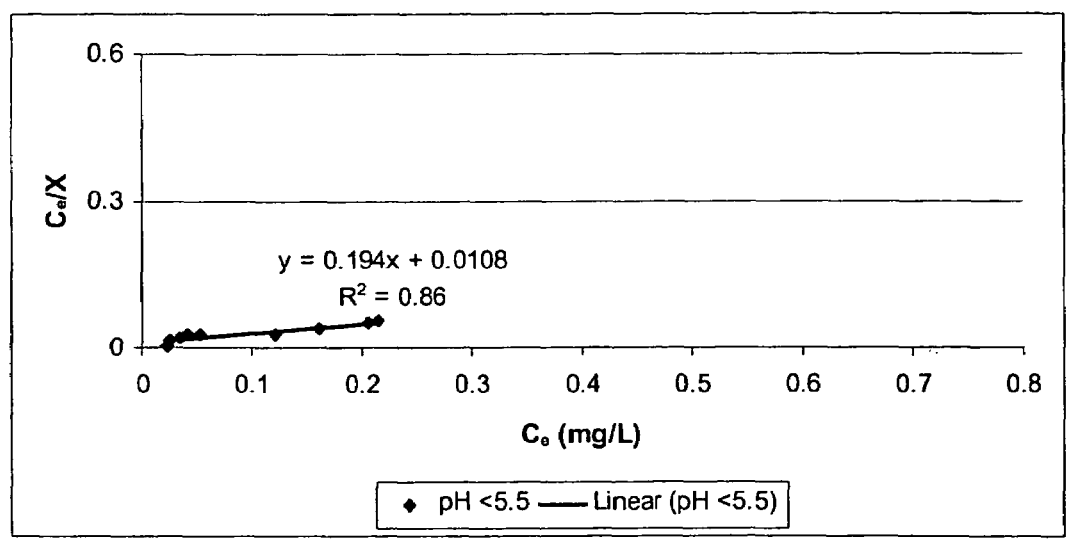
FIG. 18 shows a linearized Langmuir isotherm for 24 hour exposure time.
Figure 19:
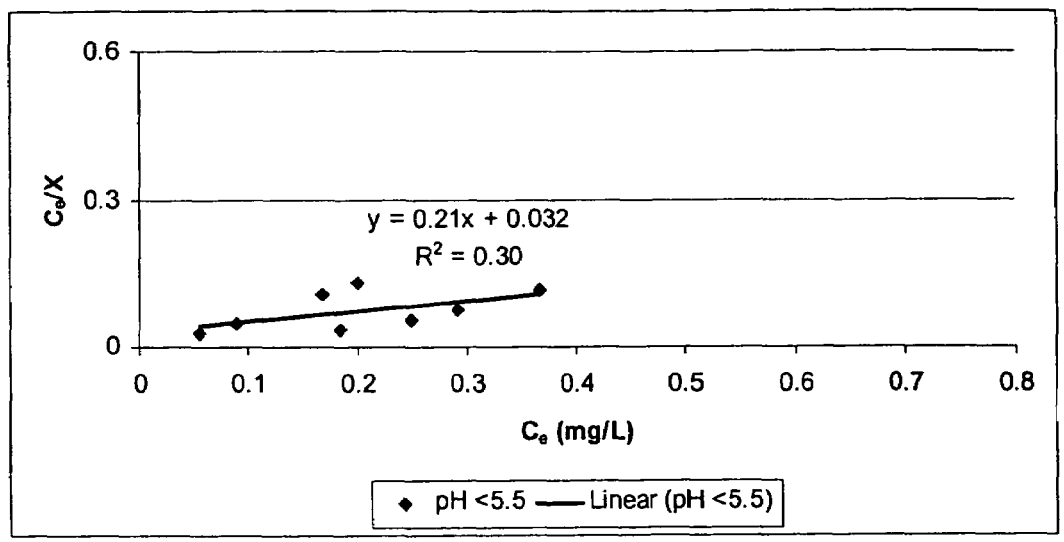
FIG. 19 shows a linearized Langmuir isotherm for 72 hour exposure time.

In general, the removal efficiency of the akaganeite-coated cotton appeared to decrease with rising pH levels, especially at levels higher than neutral pH. FIGS. 11 and 12 show the x/m ratios observed as a function of final pH and exposure time.

ANOVAs performed on this data showed that the true average x/m ratio is not likely to be equal across all pH ranges for a 95% confidence interval. Subsequent Tukey analysis showed that the difference in true average x/m values most likely occurs between pH 6 and 8.

In batch tests, akaganeite-coated cotton was able to remove arsenic to non-detectable levels from DI water with initial concentrations of 800 ppb. The likelihood of removal to non-detectable levels improved with increasing mass, increasing time, and decreasing pH.

Data collected during equilibrium and kinetics tests was broken into groups based on exposure time. This variable could not be introduced to a Langmuir Isotherm Model, so each set of data for a particular exposure time was treated as having reached equilibrium conditions to be applied to the model.

A Langmuir Isotherm was generally found to fit the data well in lower pH ranges, particularly below an equilibrium pH of 5.5. The inclusion of higher pH data only took the model further and further from a good fit to the data. The linearized forms of the isotherms developed for each group of data classified by exposure time are presented in FIGS. 13 to 19.

The slopes and intercepts of these isotherms were used to calculate the constants associated with the Langmuir Isotherm and are listed in Table 23. The constants for an exposure time of 72 hours were not calculated because the model did not fit the data sufficiently well for it to have any meaning.

TABLE 23

Langmuir Isotherm Constants for Akaganeite-Coated Cotton Media at Varying Exposure Times and Below Neutral Equilibrium pH Levels

| Exposure Time | a (mass of adsorbed solute required to completely saturate a unit mass of adsorbent) | b (experimental constant) |
|---|---|---|
| 10 minutes | 0.67 | 4.4 |
| 30 minutes | 3.18 | 16.2 |
| 1 hour | 1.48 | −1180 |
| 2 hours, pH <5.5 | 2.52 | 28 |
| 2 hours, pH <8 | 3.29 | 9.3 |
| 6 hours | 3.64 | 19.5 |
| 24 hours | 5.15 | 18.0 |

Figure 20:
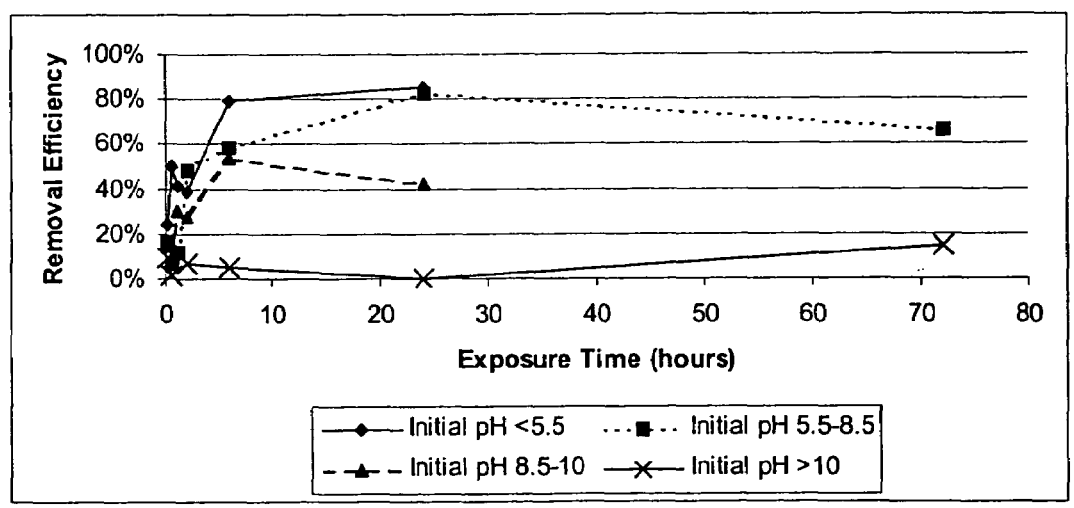
FIG. 20 shows removal efficiencies of arsenic as a function of time and pH for lower media doses (approximately 100 mg in 50 mL)

Removal efficiency was calculated for every sample analyzed by taking the ratio of arsenic present after exposure to akaganeite-coated cotton media to that prior to exposure. Data was grouped by initial pH level and media mass and the average removal efficiency for each group was then plotted as a function of time, shown in FIGS. 19 and 20.

The great majority of arsenic removal is achieved within the first 6 hours of exposure to akaganeite under optimal conditions of low pH and higher akaganeite mass.

Because of the sometimes sensitive nature of the akaganeite-coated cotton media to elevated pH and because tap waters that pass through home filtration systems have little or no atmospheric contact, the existing procedure for batch tests was re-examined. The dilution water used in preparation of an arsenic solution is exposed to the atmosphere for up to 15 minutes while mixing occurs and tubes are prepared. Additionally, when a plastic tube is loaded to 50 mL with arsenic solution, approximately 5 mL of headspace remains.

Figure 21:
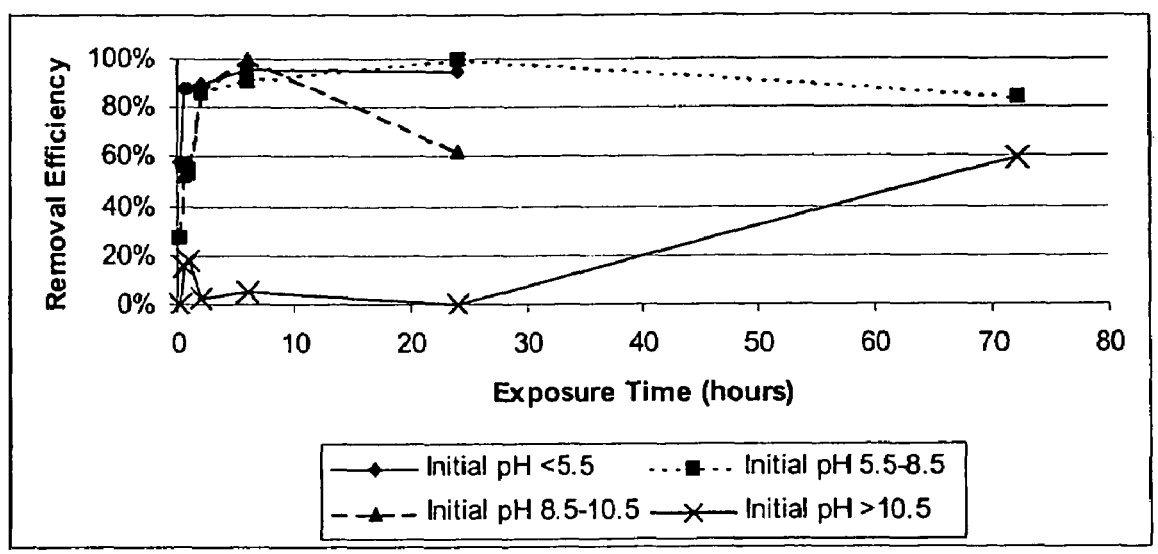
FIG. 21 shows removal efficiencies of arsenic as a function of time and pH for higher media doses (approximately 300 mg in 50 mL)

A comparative test was done with 8 tubes loaded with similar masses of akaganeite-coated cotton media. All of the tubes were then filled from the bottom upwards by using a hose connected to a faucet feeding into the bottom of the tube. Four of the tubes were filled to 50 mL and sealed, the other 4 were filled completely and sealed and the tubes were then mechanically rotated. Every half hour, one was removed and the pH measured with results shown in FIG. 21.

Figure 22:
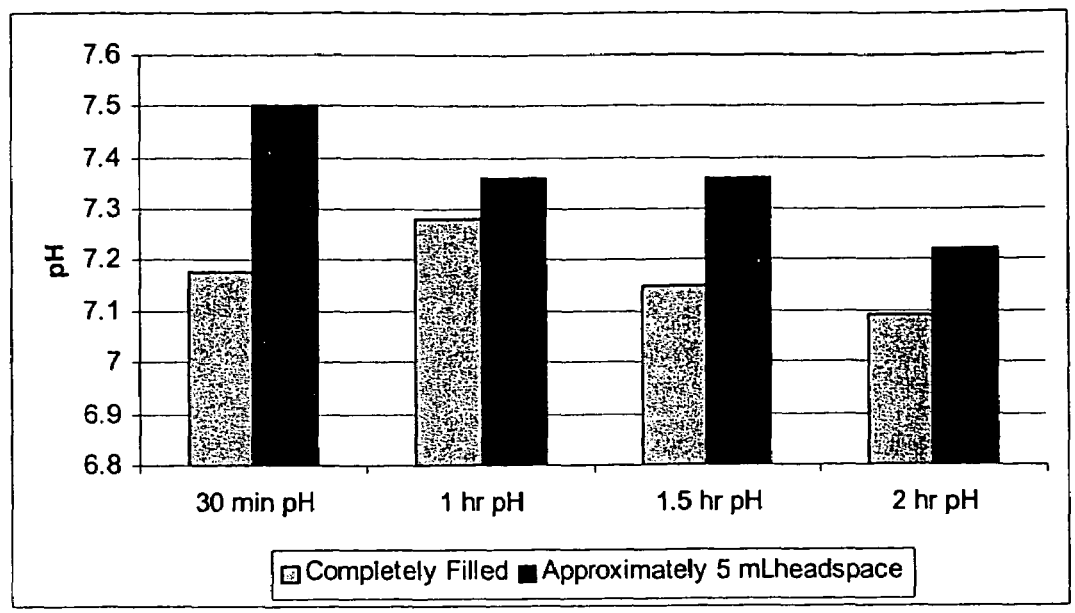
FIG. 22 shows the effect of 5 mL atmosphere on the pH of tap water.

A similar test was done where the tube pairs were loaded with media and small volumes of arsenate stock solution. Additionally, the tap water to be used for the tubes with a headspace was allowed to sit for 15 minutes prior to loading. The tubes were then subjected to mechanical rotation for 24 hours and the pH levels were subsequently measured with results presented in FIG. 22.

Based on these observations, it was concluded that the pH-lowering impact of the akaganeite media was more significant than the pH-elevating effect of exposure of the tap water to the atmosphere.

Figure 23:
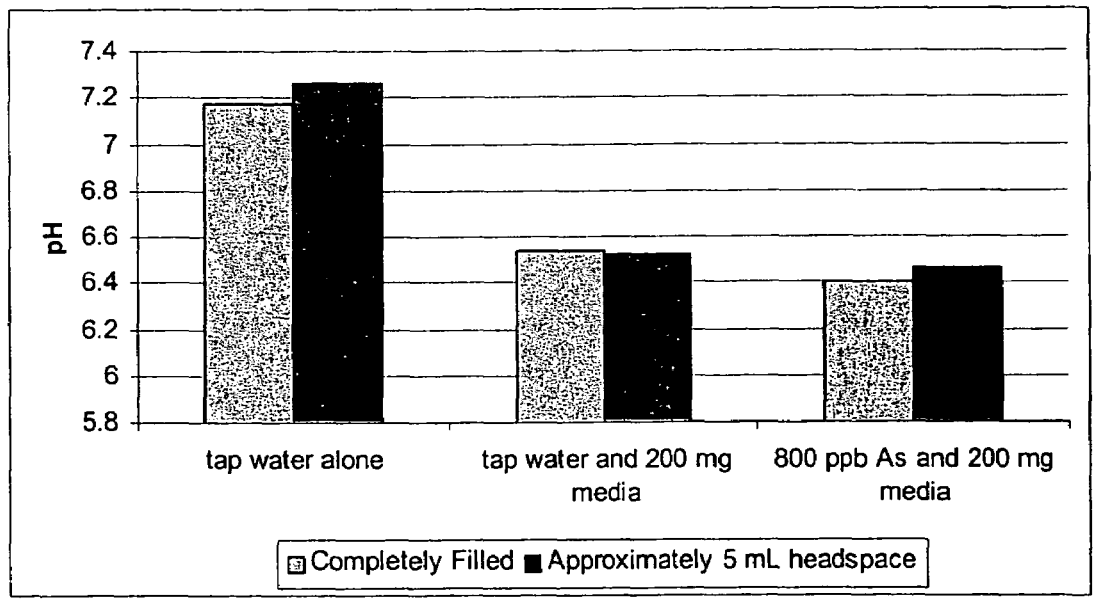
FIG. 23 shows the effect of 5 mL atmosphere on the pH of tap water in contact with akaganeite-coated cotton media.

Several batch tests using tap water were performed to determine how the akaganeite-coated cotton media might perform under more typical field conditions. These batch tests were conducted in the same fashion as those for DI water, but pH levels were not modified and only an exposure time of 24 hours was used. The x/m ratios observed for akaganeite in tap water were observed to be slightly more than half of those typical in the DI water batch tests under similar conditions, generally falling in the range of 0.5 to 1.5 mg arsenic per gram of akaganeite. A Langmuir Isotherm was also prepared for tap water, shown in FIG. 23 with the corresponding constants a=1.68 and b=55, where the constant a represents the mass of adsorbed solute required to completely saturate a unit mass of adsorbent and b is an experimental constant.

Figure 24:
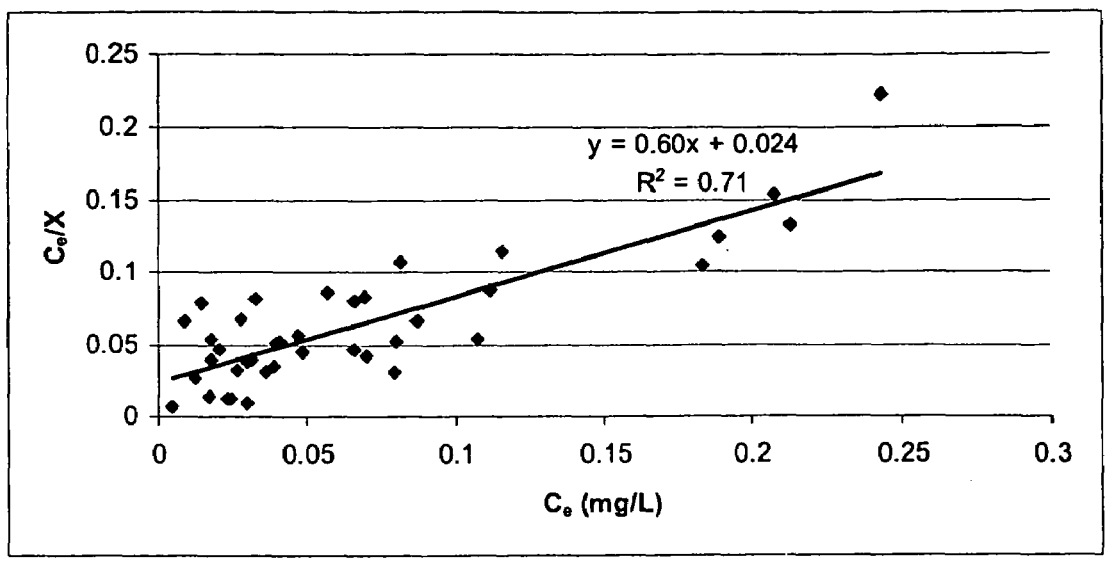
FIG. 24 shows a linearized Langmuir isotherm for twenty-four hour exposure time in tap water.

Column tests using four similar filters were conducted. The first three runs had to be terminated early due to minor system malfunctions, and the fourth filter ran for slightly over one week until the run was terminated. Influent and effluent data was collected throughout the run and are presented in FIG. 24 in terms of the ratio to the average influent concentration.

Figure 25:
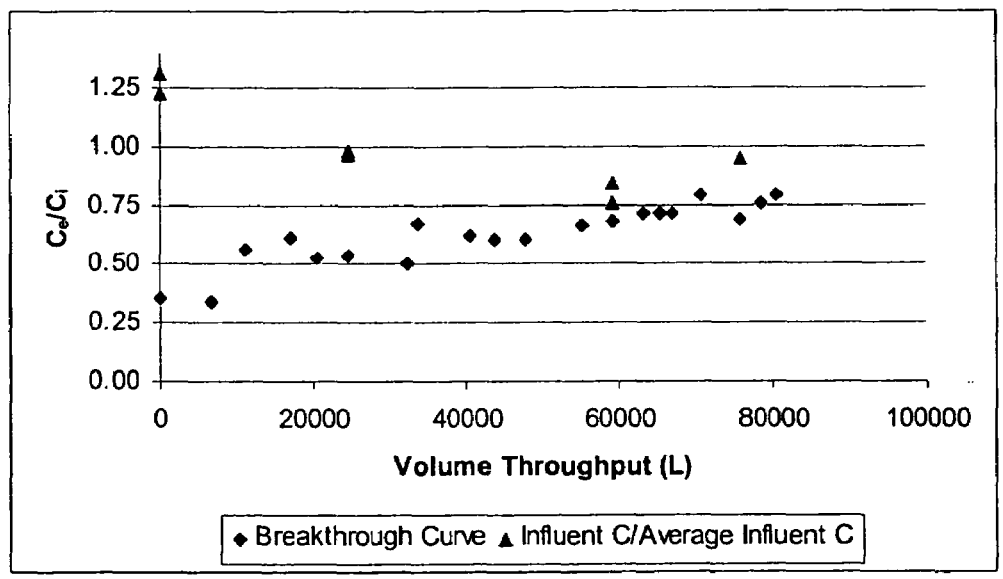
FIG. 25 shows a breakthrough curve for a column test assuming an average influent concentration.

By calculating the influent concentration for every effluent sampling point using linear interpolation between known influent measurements and taking the difference of this calculated value and the measured effluent concentration, an alternative representation of the breakthrough curve can be developed, as shown in FIG. 25. The initial elevated levels of arsenic in the filter effluent and the subsequent slow climb in effluent concentrations towards breakthrough is indicative of a short-circuiting problem.

Flow measurements done prior to installation of the filter and on the filter effluent several different times showed a consistent flow of 8 L/min.

Figure 26:
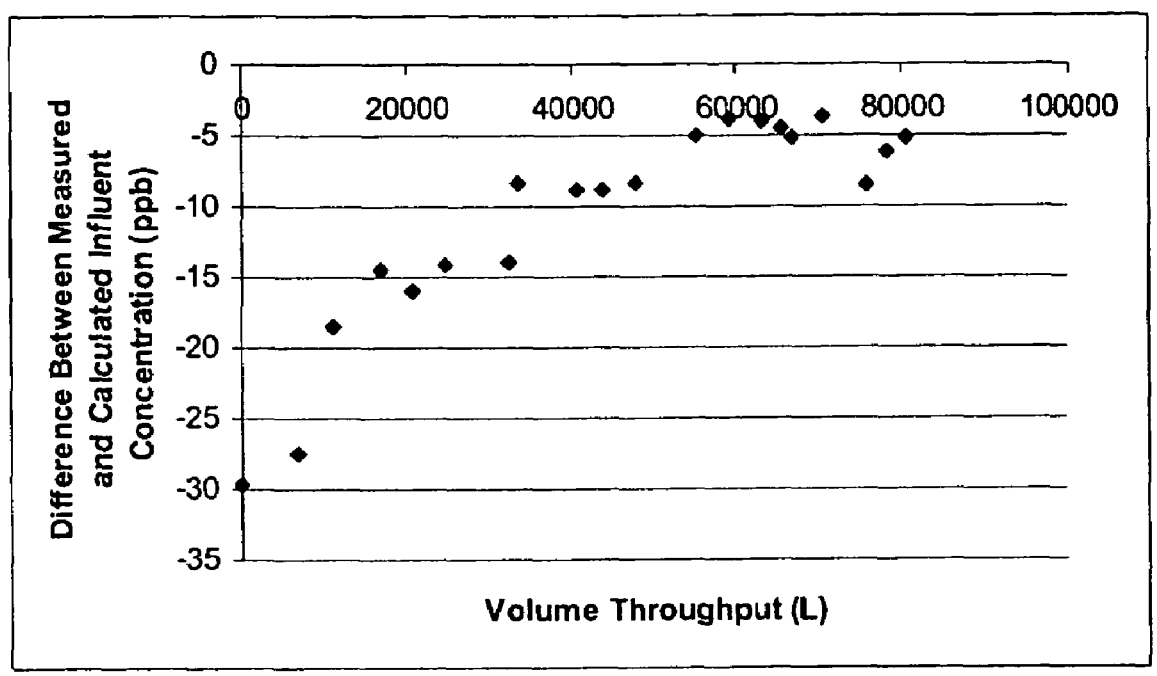
FIG. 26 shows a breakthrough curve for a column test assuming a linearly varying influent concentration between known sampling events.
Figure 27:
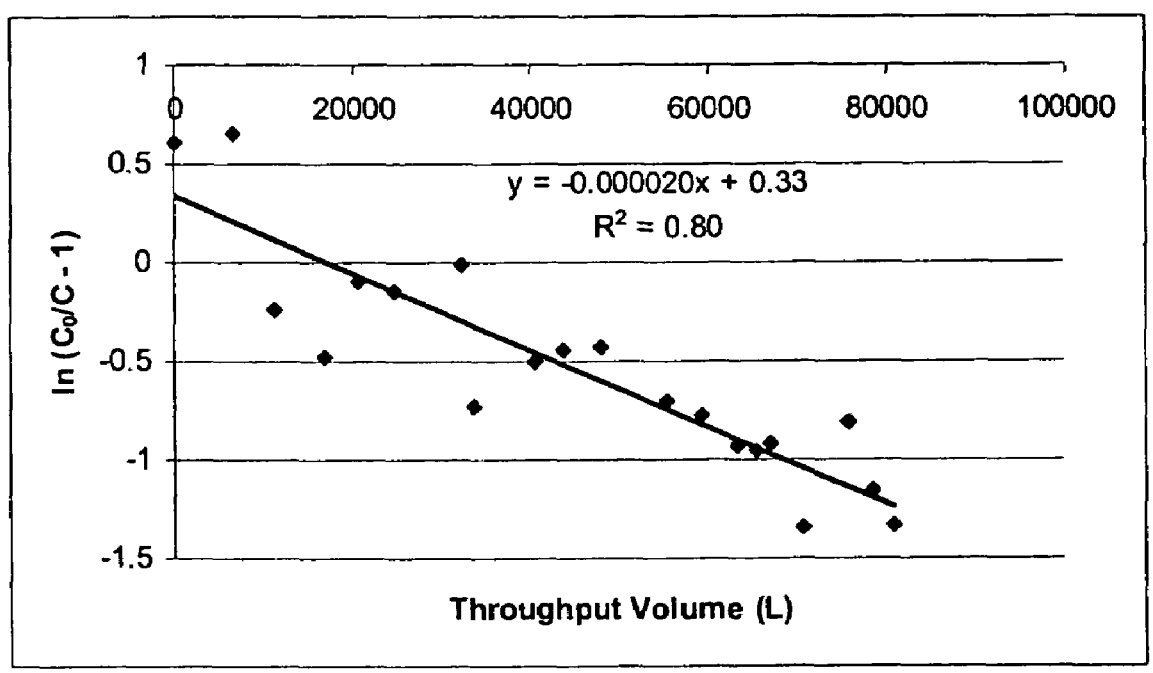
FIG. 27 shows a linearized form of the kinetic approach applied to column test data.

Using the assumption of an average influent concentration, breakthrough curve data was modeled to the kinetic approach. The resulting linearized form in shown in FIG. 26 and the calculated constants are rate constant, $k_1$=L/g–min and $q_o$=0.88 mg/g where $q_o$ represents maximum solid-phase concentration of the adsorbed solute.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s), are hereby incorporated by reference.

What is claimed is:

1. A method for removing arsenic from a fluid medium comprising the steps of:
    providing an akaganeite by dissolving a ferric chloride in water to form a ferric chloride solution;
    incubating the ferric chloride solution so that the ferric chloride is hydrolyzed;
    harvesting the akaganeite;
    concentrating the akaganeite in an aqueous solution;
    providing a carrier medium;
    attaching the akaganeite to the carrier medium to form an akaganeite laden medium;
    contacting the fluid medium containing arsenic with the akaganeite laden medium so that the arsenic is absorbed onto the akaganeite; and
    separating the akaganeite laden medium from the fluid medium so that the arsenic is removed from the fluid medium.

2. The method of claim 1 wherein the fluid medium comprises an aqueous medium.

3. The method of claim 1 wherein the arsenic comprises arsenate.

4. The method of claim 1 wherein the arsenic comprises arsenite.

5. The method of claim 1 wherein the stop of concentrating the akaganeite in solution comprises concentrating the akaganeite at a concentration of between approximately 10,000 mg/L and approximately 70,000 mg/L.

6. The method of claim 5 wherein the step of concentrating the akaganeite in solution comprises concentrating the akaganeite at a concentration of approximately 40,000 mg/L.

7. The method of claim 1 wherein the step attaching the akaganeite to the carrier medium comprises the step of mixing the akaganeite in solution with the carrier medium so that the akaganeite is bound to the carrier medium to form an akaganeite laden medium.

8. The method of claim 7 wherein the step of providing the carrier medium comprises providing a zeolite.

9. The method of claim 8 wherein the step of providing a zeolite comprises providing a clinoptilolite.

10. The method of claim 8 further comprising the step of sieving the zeolite.

11. The method of claim 10 wherein the step of sieving the zeolite comprises sieving with No. 20 and No. 40 sieves and collecting the mass of zeolites retained between the sieves.

12. The method of claim 1 wherein a material of the carrier medium provided in the step of providing a carrier medium is pumice.

13. The method of claim 1 wherein the step of providing a carrier medium comprises providing a wet medium.

14. The method of claim 13 wherein a material of the carrier medium provided in the step of providing a wet medium includes at least one of cellulose sponges, gel-based media, and a combination thereof.

15. The method of claim 1 wherein a step material of the carrier medium provided in the of providing a carrier medium is sand.

16. The method of claim 1 wherein a material of the carrier medium provided in the step of providing a carrier medium is limestone.

17. The method of claim 1 wherein a material of the carrier medium provided in the step of providing a carrier medium is sea shells.

18. The method of claim 1 wherein a material of the carrier medium provided in the step of providing a carrier medium is fibrous material.

19. The method of claim 18 wherein the step of providing a fibrous material comprises providing cotton.

* * * * *